(12) United States Patent
Kim et al.

(10) Patent No.: US 8,963,459 B2
(45) Date of Patent: Feb. 24, 2015

(54) METHOD AND APPARATUS FOR DRIVING ALTERNATING-CURRENT MOTOR

(75) Inventors: Sang-Min Kim, Changwon (KR); Sung-Min Kim, Seoul (KR); Seung-Ki Sul, Seoul (KR); Seung-Eun Park, Changwon (KR); Yong-Cheul Kwon, Seoul (KR); Joon-Ho Park, Changwon (KR)

(73) Assignees: Samsung Techwin Co., Ltd., Changwon (KR); Seoul National University Industry Foundation, Seoul (KR)

( * ) Notice: Subject to any disclaimer, the term of this patent is extended or adjusted under 35 U.S.C. 154(b) by 128 days.

(21) Appl. No.: 13/483,372

(22) Filed: May 30, 2012

(65) Prior Publication Data

US 2013/0057184 A1 Mar. 7, 2013

(30) Foreign Application Priority Data

Sep. 7, 2011 (KR) ........................ 10-2011-0090738
Mar. 15, 2012 (KR) ........................ 10-2012-0026605

(51) Int. Cl.
*H02P 21/00* (2006.01)
*H02P 1/16* (2006.01)
(Continued)

(52) U.S. Cl.
CPC ............ *H02P 6/183* (2013.01); *H02P 21/0039* (2013.01); *H02P 21/146* (2013.01)
USPC ...... 318/400.02; 318/778; 318/807; 318/715; 318/727

(58) Field of Classification Search
CPC .................................................. H02P 21/0035

USPC ............ 318/400.02, 807, 715, 727; 307/151; 363/1–12, 150
See application file for complete search history.

(56) References Cited

U.S. PATENT DOCUMENTS

| | | | | |
|---|---|---|---|---|
| 5,144,564 A | * | 9/1992 | Naidu et al. ................... | 318/721 |
| 6,531,843 B2 | * | 3/2003 | Iwaji et al. ..................... | 318/727 |

(Continued)

FOREIGN PATENT DOCUMENTS

| | | |
|---|---|---|
| JP | 2002-281782 A | 9/2002 |
| JP | 2010-051078 A | 3/2010 |

(Continued)

OTHER PUBLICATIONS

ICPE 2011-ECCE Asia, 8th International Conference on Power Electronics—ECCE Asia May 30-Jun. 3, 2011, The Shilla Jeju, Korea, Final Program All Session referring to p. 67 (Total 96 pages).

(Continued)

*Primary Examiner* — Rita Leykin
*Assistant Examiner* — Zemenay Truneh
(74) *Attorney, Agent, or Firm* — Sughrue Mion, PLLC

(57) ABSTRACT

A method of driving an alternating-current (AC) motor while periodically obtaining a rotator angle of the AC motor. The method includes: (a) driving the AC motor by a $d^S$-axis voltage, which is a voltage for an exciting current in a stationary reference frame, and a $q^S$-axis voltage, which is a voltage for generating a rotational force in the stationary reference frame, while sequentially applying different $d^S$-axis voltages and different $q^S$-axis voltages to the AC motor in a control injection period; and (b) obtaining a rotator angle by a $d^S$-axis voltage value, a $q^S$-axis voltage value, a $d^S$-axis current value, and a $q^S$-axis current value in the control injection period.

4 Claims, 9 Drawing Sheets

(51) Int. Cl.
*H02P 6/18* (2006.01)
*H02P 21/14* (2006.01)

(56) References Cited

U.S. PATENT DOCUMENTS

| | | | |
|---|---|---|---|
| 6,577,096 B2* | 6/2003 | Cho | 318/727 |
| 6,580,247 B2 | 6/2003 | Nakazawa | |
| 6,741,060 B2* | 5/2004 | Krefta et al. | 318/727 |
| 6,788,024 B2* | 9/2004 | Kaneko et al. | 318/807 |
| 6,831,440 B1* | 12/2004 | Royak et al. | 318/727 |
| 7,176,652 B2* | 2/2007 | Wakabayashi et al. | 318/400.02 |
| 7,211,984 B2* | 5/2007 | Patel et al. | 318/778 |
| 7,557,530 B2* | 7/2009 | Tesch et al. | 318/700 |
| 8,159,161 B2 | 4/2012 | Tomigashi | |
| 2001/0002784 A1* | 6/2001 | Masaki et al. | 318/727 |
| 2002/0041171 A1* | 4/2002 | Cho | 318/727 |
| 2002/0163319 A1* | 11/2002 | Kaneko et al. | 318/727 |
| 2003/0062870 A1* | 4/2003 | Royak et al. | 318/727 |
| 2006/0097688 A1* | 5/2006 | Patel et al. | 318/778 |
| 2009/0230900 A1* | 9/2009 | Bae et al. | 318/400.02 |

FOREIGN PATENT DOCUMENTS

| | | |
|---|---|---|
| KR | 10-0176469 B1 | 5/1999 |
| KR | 10-2004-0025530 A | 3/2004 |
| KR | 10-2005-0092000 A | 9/2005 |
| KR | 10-2011-0014874 A | 2/2011 |

OTHER PUBLICATIONS

Kim, et al., "Position Sensorless Operation of IPMSM with Near PWM Switching Frequency Signal Injection", 8th International Conference on Power Electronics—ECCE Asia May 30-Jun. 3, 2011, The Shilla Jeju, Korea, p. 1660-1665.

* cited by examiner

METHOD AND APPARATUS FOR DRIVING ALTERNATING-CURRENT MOTOR

CROSS-REFERENCE TO RELATED PATENT APPLICATIONS

This application claims priority from Korean Patent Application No. 10-2011-0090738, filed on Sep. 7, 2011, and Korean Patent Application No. 10-2012-0026605, filed on Mar. 15, 2012 in the Korean Intellectual Property Office, the disclosures of which are incorporated herein in their entirety by reference.

BACKGROUND

1. Field of the Invention

Methods and apparatuses consistent with exemplary embodiments relate to driving an alternating-current (AC) motor, and more particularly, to driving an AC motor while periodically obtaining a rotator angle of the AC motor.

2. Description of the Related Art

In a method of driving an AC motor, $d^S$- and $q^S$-axes target current values in a synchronous reference frame are used.

Thus, based on a current rotator angle, $d^S$- and $q^S$-axes driving current values in a stationary reference frame are transformed to $d^S$- and $q^S$-axes driving current values in the synchronous reference frame to be fed back. In addition, based on a current rotator angle, $d^S$- and $q^S$-axes control voltage values in the synchronous reference frame are transformed to $d^S$- and $q^S$-axes control voltage values in the stationary reference frame to perform a control.

Accordingly, it is important to accurately determine a current rotator angle, and to do this, a resolver is used in a related art. For example, referring to Korean Patent No. 0176469, a technique of measuring a location of a rotator by attaching a resolver to a servo motor is disclosed. Here, the resolver generates location data of the rotator.

Thus, according to a related art method and apparatus for driving an AC motor as described above, using an additional rotator location detecting apparatus such as a resolver causes a large size of an apparatus for driving the AC motor and high manufacturing costs.

For example, a resolver, signal connection connectors and cables, and a device (e.g., a resolver-to-digital converter (RDC)) and a circuit for an output signal of the resolver must be added.

SUMMARY

One or more exemplary embodiments provide a method and apparatus for driving an alternating-current (AC) motor by internally detecting a rotator location without using an additional rotator location detecting apparatus such as a resolver, thereby reducing a size and unit manufacturing cost of an apparatus for driving the AC motor. According to an aspect of an exemplary embodiment, there is provided a method of driving an alternating-current (AC) motor while periodically obtaining a rotator angle of the AC motor, the method including: (a) driving the AC motor by a $d^S$-axis voltage, which is a voltage for an exciting current in a stationary reference frame, and a $q^S$-axis voltage, which is a voltage for generating a rotational force in the stationary reference frame, while sequentially applying different $d^S$-axis voltages and different $q^S$-axis voltages to the AC motor in a control injection period; and (b) obtaining a rotator angle by a $d^S$-axis voltage value, a $q^S$-axis voltage value, a $d^S$-axis current value, and a $q^S$-axis current value in the control injection period.

Operation (b) may include: (b1) obtaining difference values between current variations corresponding to the applied voltages and difference values between the applied voltages; and (b2) obtaining the rotator angle in the control injection period by using a matrix equation according to an inductance matrix of the AC motor, a voltage matrix including the voltage difference values, and a current matrix including the current variation difference values.

In the control injection period of operation (a), four pairs of $d^S$- and $q^S$-axes injection voltages having different polarity sets may be sequentially applied to the AC motor, and in the control injection period of operation (b), a rotator angle in a current unit period may be obtained according to a result of subtracting a $d^S$-axis injection current value in a previous unit period from a $q^S$-axis injection current value in the current unit period and a result of adding a $d^S$-axis injection current value in the current unit period to a $q^S$-axis injection current value in the previous unit period.

According to an aspect of another exemplary embodiment, there is provided an apparatus for driving an alternating-current (AC) motor while periodically obtaining a rotator angle of the AC motor, the apparatus including: a controller and a driver.

The driver may drive the AC motor according to a voltage applied from the controller.

The controller may include a driving controller and a rotator location detector.

The driving controller may drive the AC motor by a $d^S$-axis voltage, which is a voltage for an exciting current in a stationary reference frame, and a $q^S$-axis voltage, which is a voltage for generating a rotational force in the stationary reference frame, while sequentially applying different $d^S$-axis voltages and different $q^S$-axis voltages to the AC motor in a control injection period.

The rotator location detector may obtain a rotator angle by a $d^S$-axis voltage value, a $q^S$-axis voltage value, a $d^S$-axis current value, and a $q^S$-axis current value in the control injection period.

The rotator location detector may obtain difference values between current variations corresponding to the applied voltages and difference values between the applied voltages and obtain the rotator angle in the control injection period by using a matrix equation according to an inductance matrix of the AC motor, a voltage matrix including the voltage difference values, and a current matrix including the current variation difference values.

The driving controller may sequentially apply four pairs of $d^S$- and $q^S$-axes injection voltages having different polarity sets to the AC motor in the control injection period, and the rotator location detector may obtain a rotator angle in a current unit period in the control injection period according to a result of subtracting a $d^S$-axis injection current value in a previous unit period from a $q^S$-axis injection current value in the current unit period and a result of adding a $d^S$-axis injection current value in the current unit period to a $q^S$-axis injection current value in the previous unit period.

According to an aspect of another exemplary embodiment, when different $d^S$-axis voltages and different $q^S$-axis voltages are sequentially applied to an AC motor in a control injection period, a rotator angle may be obtained by a $d^S$-axis voltage, a $q^S$-axis voltage, a $d^S$-axis current, and a $q^S$-axis current.

Thus, a rotator location may be internally detected without using an additional rotator location detecting apparatus such as a resolver, thereby reducing a size and unit manufacturing cost of an apparatus for driving the AC motor.

BRIEF DESCRIPTION OF THE DRAWINGS

The above and other aspects will become more apparent by describing in detail exemplary embodiments thereof with reference to the attached drawings, in which.

DETAILED DESCRIPTION

The description below and the accompanying drawings are provided to understand operations according to the exemplary embodiments, and parts that can be easily implemented by those of ordinary skill in the art may be omitted.

In addition, the specification and the drawings are not provided to limit the inventive concept, and the scope of the inventive concept is defined by the claims. The terminology used in the specification is analyzed as meanings and concepts conforming to the technical spirit inventive concept to most properly represent the inventive concept.

As a reference, in the specification, the drawings, and the claims, a superscript "s" indicates a stationary reference frame, a superscript "r" indicates a synchronous reference frame, and a subscript "s" indicates a stator.

Hereinafter, exemplary embodiments are described with reference to the accompanying drawings.

Figure 1:
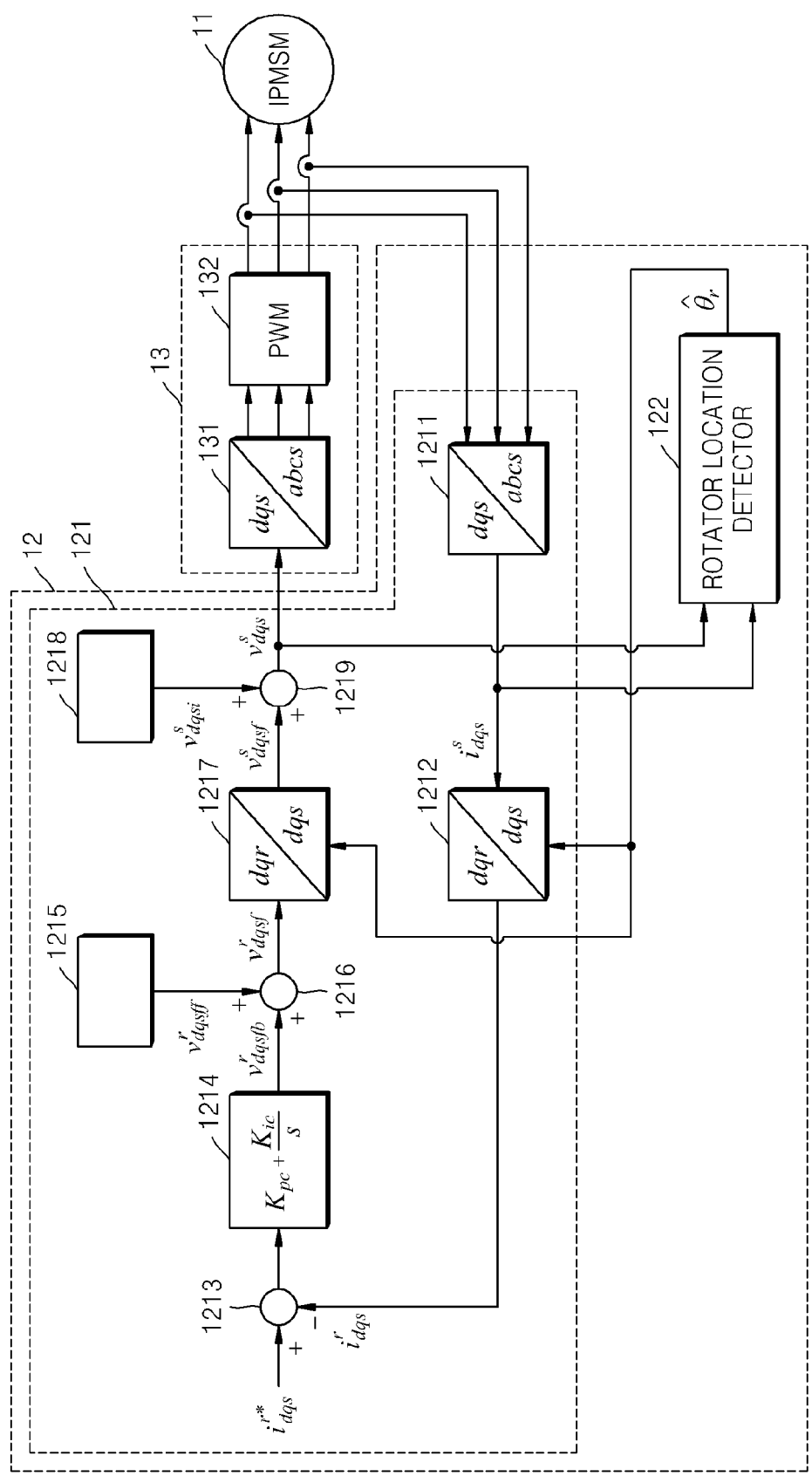
FIG. 1 is a block diagram for describing a method and apparatus for driving an AC motor according to a first exemplary embodiment.

FIG. 1 is a block diagram for describing a method and apparatus for driving an AC motor according to a first exemplary embodiment.

Figure 2:
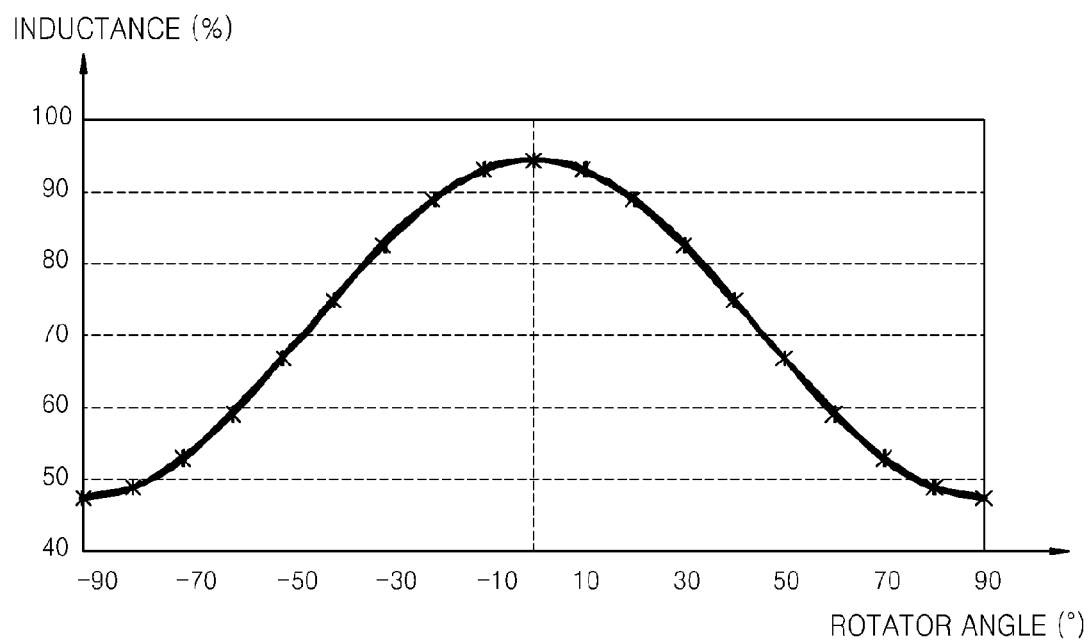
FIG. 2 is a graph showing that an inductance varies according to a rotator angle in a general induction motor as a principle of deriving the first exemplary embodiment of FIG. 1.

FIG. 2 is a graph showing that an inductance varies according to a rotator angle in a general induction motor as a principle of deriving the first exemplary embodiment of FIG. 1.

Figure 3:
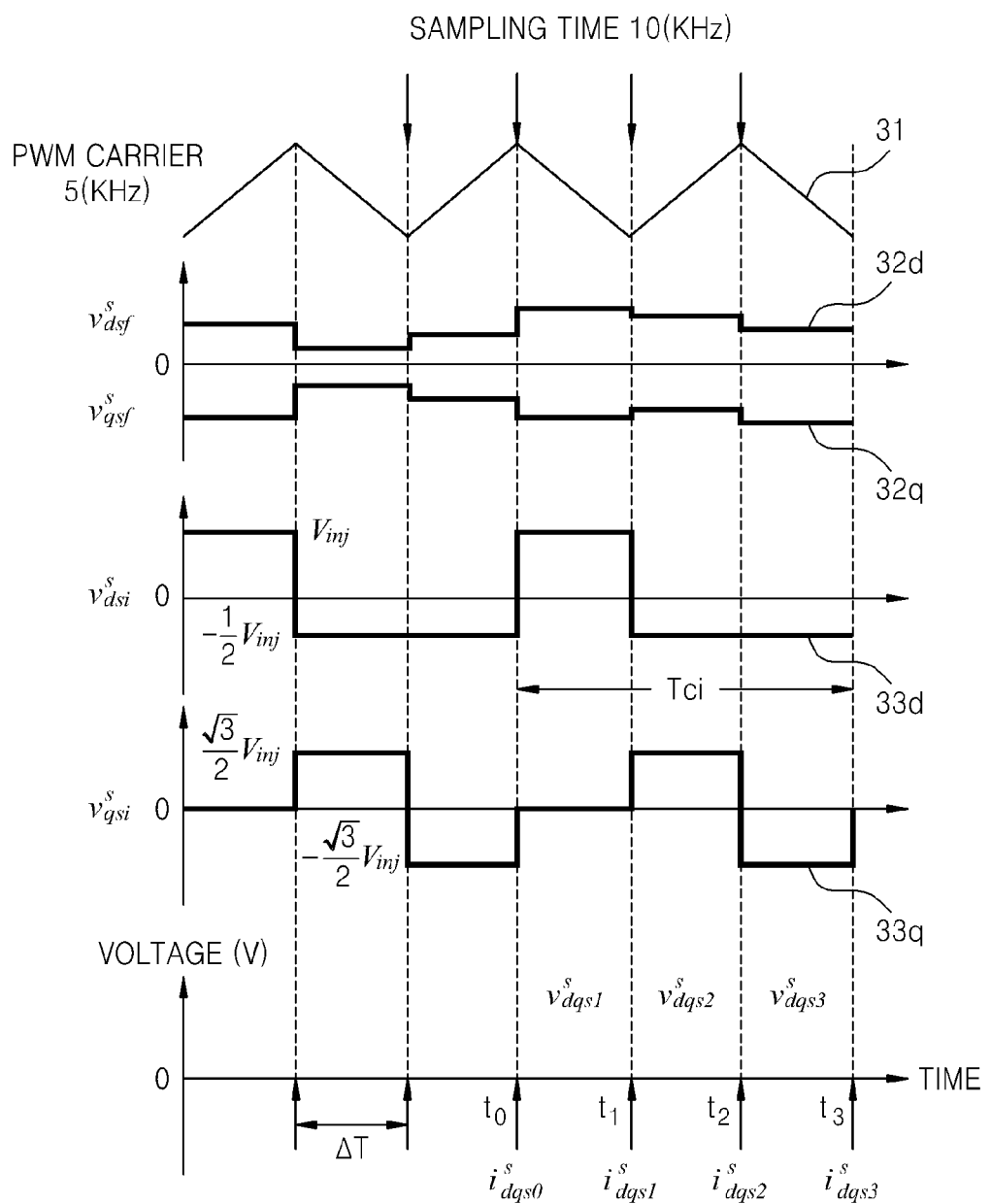
FIG. 3 is a timing diagram showing a $d^s$-axis control voltage value $v^s_{dsf}$ and a $q^s$-axis control voltage value $v^s_{qsf}$ from a control voltage transformer and an additional $d^s$-axis injection voltage value $v^s_{dsi}$ and an additional $q^s$-axis injection voltage value $v^s_{qs}$ from an injection voltage generator according to a control period of a Pulse Width Modulation (PWM) carrier signal in the apparatus of FIG. 1.

FIG. 3 is a timing diagram showing a $d^s$-axis control voltage value $v^s_{dsf}$ and a $q^s$-axis control voltage value $v^s_{qsf}$ from a control voltage transformer and an additional $d^s$-axis injection voltage value $v^s_{dsi}$ and an additional $q^s$-axis injection voltage value $v^s_{qsi}$ from an injection voltage generator according to a control period of a Pulse Width Modulation (PWM) carrier signal in the apparatus of FIG. 1.

Figure 4:
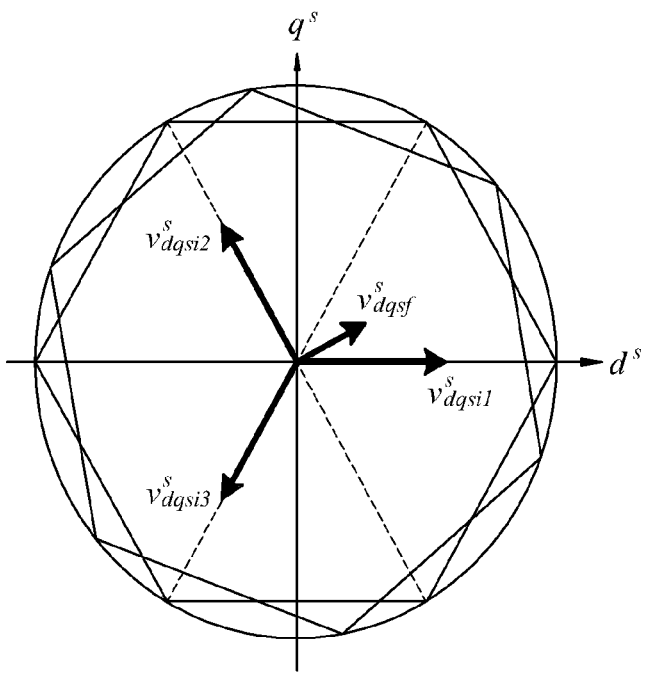
FIG. 4 is a vector diagram showing that first $d^s$- and $q^s$-axes injection voltages $v^s_{dqsi1}$, second $d^s$- and $q^s$-axes injection voltages $v^s_{dqsi2}$, and third $d^s$- and $q^s$-axes injection voltages $v^s_{dqsi3}$ have a phase difference of 120° therebetween with respect to the $d^s$- and $q^s$-axes control voltage values $v^s_{dqsf}$ of FIG. 3 in a control injection period.

FIG. 4 is a vector diagram showing that first $d^s$- and $q^s$-axes injection voltages $v^s_{dqsi1}$, second $d^s$- and $q^s$-axes injection voltages $v^s_{dqsi2}$, and third $d^s$- and $q^s$-axes injection voltages $v^s_{dqsi3}$ have a phase difference of 120° therebetween with respect to the $d^s$- and $q^s$-axes control voltage values $v^s_{dqsf}$ of FIG. 3 in a control injection period.

Referring to FIGS. 1 to 4, the apparatus according to the first exemplary embodiment drives an AC motor 11 while periodically obtaining a rotator angle of the AC motor 11, e.g., an Interior-mounted Permanent Magnet Synchronous Motor (IPMSM), and includes a controller 12 and a driver 13.

The driver 13 drives the AC motor 11 according to voltages $v^s_{dqs}$ applied from the controller 12.

The controller 12 includes a driving controller 121 and a rotator location detector 122.

The driving controller 121 applies to the driver 13 a $d^s$-axis voltage $v^s_{ds}$, which is a voltage for an exciting current in a stationary reference frame dqs, and a $q^s$-axis voltage $v^s_{qs}$, which is a voltage for generating a rotational force in the stationary reference frame dqs, to the driver 13 while sequentially applying different $d^s$- and $q^s$-axes voltages $v^s_{dqs}$ in a control injection period (Tci of FIG. 3).

The rotator location detector 122 obtains a rotator angle $\hat{\theta}_r$ by the $d^s$-axis voltage $v^s_{ds}$, the $q^s$-axis voltage $v^s_{qs}$, a $d^s$-axis current $i^s_{ds}$, and a $q^s$-axis current $i^s_{qs}$ in the control injection period Tci.

In the first exemplary embodiment, the rotator location detector 122 obtains difference values between variations of currents $i^s_{dqs}$ corresponding to the applied voltages $v^s_{dqs}$ from the driving controller 121 and difference values between the applied voltages $v^s_{dqs}$, and obtains the rotator angle $\hat{\theta}_r$ in the control injection period Tci by using a matrix equation according to an inductance matrix of the AC motor 11, a voltage matrix including the voltage difference values, and a current matrix including the variation difference values of the currents $i^s_{dqs}$.

Thus, the rotator location $\hat{\theta}_r$ can be internally detected without using an additional rotator location detecting apparatus such as a resolver, thereby reducing a size and unit manufacturing costs of the apparatus (12 and 13) for driving the AC motor 11.

When a three-phase AC voltage is applied to a stator of the AC motor 11, a rotator of the AC motor 11 rotates. The driver 13 includes a driving voltage transformer 131 and a PWM 132.

The driving voltage transformer 131 transforms the applied voltages $v^s_{dqs}$, which are the $d^s$-axis voltage $v^s_{ds}$ and the $q^s$-axis voltage $v^s_{qs}$ from the controller 12, to a three-phase AC voltage.

The PWM 132 applies the three-phase AC voltage from the driving voltage transformer 131 to the stator of the AC motor 11 via pulse width modulation.

The driving controller 121 includes a first feedback current transformer 1211, a second feedback current transformer 1212, a current subtractor 1213, a proportional-integral controller 1214, a forward control voltage generator 1215, a first voltage adder 1216, a control voltage transformer 1217, an injection voltage generator 1218, and a second voltage adder 1219.

The first feedback current transformer 1211 obtains the $d^s$- and $q^s$-axes driving currents $i^s{}_{dqs}$ in the stationary reference frame dqs by detecting a three-phase driving current in a three-phase reference frame abcs, which flows through the stator of the AC motor 11.

The second feedback current transformer 1212 transforms the $d^s$- and $q^s$-axes driving currents $i^s{}_{dqs}$ in the stationary reference frame dqs, which are input from the first feedback current transformer 1211, to $d^s$- and $q^s$-axes driving currents $i^r{}_{dqs}$ in a synchronous reference frame dqr, according to the rotator angle $\hat{\theta}_r$ input from the rotator location detector 122.

The current subtractor 1213 generates error currents, which are difference values between $d^s$- and $q^s$-axes target currents $i^{r*}{}_{dqs}$ in the synchronous reference frame dqr and the $d^s$- and $q^s$-axes driving currents $i^r{}_{dqs}$ input from the second feedback current transformer 1212.

The proportional-integral controller 1214 obtains $d^s$- and $q^s$-axes feedback control voltages $v^r{}_{dqsfb}$ in the synchronous reference frame dqr by performing a proportional-integral control of the error currents input from the current subtractor 1213.

The forward control voltage generator 1215 generates $d^s$- and $q^s$-axes forward control voltages $v^r{}_{dqsff}$ in the synchronous reference frame dqr, which conforms to unique characteristics of the AC motor 11.

The first voltage adder 1216 generates $d^s$- and $q^s$-axes control voltages $v^r{}_{dqsf}$ obtained by adding the $d^s$- and $q^s$-axes feedback control voltages $v^r{}_{dqsfb}$ input from the proportional-integral controller 1214 to the $d^s$- and $q^s$-axes forward control voltages $v^r{}_{dqsff}$ input from the forward control voltage generator 1215.

The control voltage transformer 1217 transforms the $d^s$- and $q^s$-axes control voltages $v^r{}_{dqsf}$ in the synchronous reference frame dqr, which are input from the first voltage adder 1216, to $d^s$- and $q^s$-axes control voltages $v^s{}_{dqsf}$ in the stationary reference frame dqs according to the input rotator angle $\hat{\theta}_r$.

The injection voltage generator 1218 for rotator location detection generates additional $d^s$- and $q^s$-axes injection voltages $v^s{}_{dqs}$, used to sequentially generate different $d^s$-axis voltages and different $q^s$-axis voltages from the applied voltages $v^s{}_{dqs}$ in the control injection period Tci.

A control injection frequency, which is an inverse value of the control injection period Tci, is preferably, but not necessarily, ⅔ of a switching frequency of the PWM 132.

For example, when the switching frequency of the PWM 132 is 5 KHz and the proportional-integral controller 1214 performs double sampling, a sampling frequency of the proportional-integral controller 1214 is 10 KHz, and the control injection frequency is about 3.33 KHz.

The second voltage adder 1219 provides the applied voltages $v^s{}_{dqs}$ obtained by adding the $d^s$- and $q^s$-axes control voltages $v^s{}_{dqsf}$ in the stationary reference frame dqs, which are input from the control voltage transformer 1217, to the $d^s$- and $q^s$-axes injection voltages $v^s{}_{dqs}$, in the stationary reference frame dqs, which are input from the injection voltage generator 1218, to the driving voltage transformer 131 of the driver 13.

In addition, the second voltage adder 1219 outputs a first $d^s$-axis voltage $v^s{}_{ds1}$ in a first unit period (a sampling period ΔT, $t_0$ to $t_1$, of FIG. 3) of the control injection period Tci, a second $d^s$-axis voltage $v^s{}_{ds2}$ in a second unit period (a sampling period ΔT, $t_1$ to $t_2$, of FIG. 3) of the control injection period Tci, and a third $d^s$-axis voltage $v^s{}_{ds3}$ in a third unit period (a sampling period ΔT, $t_2$ to $t_3$, of FIG. 3) of the control injection period Tci.

Hereinafter, an operational principle of the rotator location detector 122 of FIG. 1 is described with equations.

In general, voltage equations of the three-phase AC motor 11 in a stationary reference frame are represented by Equation 1.

$$\begin{bmatrix} v^s_{ds} \\ v^s_{qs} \end{bmatrix} = R_s \begin{bmatrix} i^s_{ds} \\ i^s_{qs} \end{bmatrix} + \frac{d}{dt} \begin{bmatrix} \lambda^s_{ds} \\ \lambda^s_{qs} \end{bmatrix} \quad (1)$$

$$\begin{bmatrix} \lambda^s_{ds} \\ \lambda^s_{qs} \end{bmatrix} = L_S \begin{bmatrix} i^s_{ds} \\ i^s_{qs} \end{bmatrix} + \lambda_f \begin{bmatrix} \cos\theta_r \\ \sin\theta_r \end{bmatrix}$$

$$L_S = \begin{bmatrix} \Sigma L + \Delta L \cos 2\theta_r & \Delta L \sin 2\theta_r \\ \Delta L \sin 2\theta_r & \Sigma L - \Delta L \cos 2\theta_r \end{bmatrix}$$

$$\Sigma L = \frac{L_{ds} + L_{qs}}{2}$$

$$\Delta L = \frac{L_{ds} - L_{qs}}{2}$$

In Equation 1, $v^s{}_{ds}$ denotes a $d^s$-axis control voltage, $v^s{}_{qs}$ denotes a $q^s$-axis control voltage, $R_s$ denotes a stator resistance, $i^s{}_{ds}$ denotes a $d^s$-axis stator current, $i^s{}_{qs}$ denotes a $q^s$-axis stator current, $\lambda^s{}_{ds}$ denotes a $d^s$-axis flux, $\lambda^s{}_{qs}$ denotes a $q^s$-axis flux, $L_S$ denotes an inductance matrix, $\lambda^2{}_f$ denotes a basic flux, $\theta_r$ denotes a rotator angle, $L_{ds}$ denotes a $d^s$-axis inductance, and $L_{qs}$ denotes a $q^s$-axis inductance.

Thus, a relational equation between a voltage and a current by an inductance can be induced by Equation 2.

$$\begin{bmatrix} v^s_{ds} \\ v^s_{qs} \end{bmatrix} = R_s \begin{bmatrix} i^s_{ds} \\ i^s_{qs} \end{bmatrix} + L_S \frac{d}{dt} \begin{bmatrix} i^s_{ds} \\ i^s_{qs} \end{bmatrix} + 2\omega_r \Delta L \begin{bmatrix} -\sin 2\theta_r & \cos 2\theta_r \\ \cos 2\theta_r & \sin 2\theta \end{bmatrix} \begin{bmatrix} i^s_{ds} \\ i^s_{qs} \end{bmatrix} + \quad (2)$$

$$\lambda_f \begin{bmatrix} -\omega_r \sin\theta_r \\ \omega_r \cos\theta_r \end{bmatrix}$$

$$= \begin{bmatrix} v^s_{dsf} \\ v^s_{qsf} \end{bmatrix} + \begin{bmatrix} v^s_{dsc} \\ v^s_{qsc} \end{bmatrix}$$

$$\approx R_s \begin{bmatrix} i^s_{dsf} \\ i^s_{qsf} \end{bmatrix} + \omega_r \left( L_C \begin{bmatrix} i^s_{dsf} \\ i^s_{qsf} \end{bmatrix} + \lambda_f \begin{bmatrix} -\sin\theta_r \\ \cos\theta_r \end{bmatrix} \right) + L_S \frac{1}{\Delta T} \begin{bmatrix} i^s_{dsc} \\ i^s_{qsc} \end{bmatrix}$$

In Equation 2, $\omega_r$ denotes a rotator angular velocity, $v^s{}_{dsf}$ denotes a $d^s$-axis control voltage of a basic frequency component, $v^s{}_{qsf}$ denotes a $q^s$-axis control voltage of the basic frequency component, $v^s{}_{dsc}$ denotes a $d^s$-axis control voltage of a control frequency component higher than a basic frequency, $v^s{}_{qsc}$ denotes a $q^s$-axis control voltage of the control frequency component, $i^s{}_{dsf}$ denotes a $d^s$-axis current of the basic frequency component, $i^s{}_{qsf}$ denotes a $q^s$-axis current of the basic frequency component, $i^s{}_{dsc}$ denotes a $d^s$-axis current of the control frequency component, $i^s{}_{qsc}$ ddenotes a $q^s$-axis current of the control frequency component, ΔT denotes a unit period as a sampling period, and $L_c$ denotes a transposition variable for simplifying an inductance-related term.

A frequency of the $d^s$- and $q^s$-axes injection voltages $v^s{}_{dqs}$, in the stationary reference frame dqs, which are output from the injection voltage generator 1218, is much higher than a frequency of the $d^s$- and $q^s$-axes control voltages $v^s{}_{dqsf}$ in the stationary reference frame dqs, which are output from the control voltage transformer 1217.

Since the $d^s$-axis injection voltage $v^s_{dsi}$ and the $q^s$-axis injection voltage $v^s_{qs}$, in the stationary reference frame dqs, which are output from the injection voltage generator 1218, are added, Equation 3 is established.

$$\begin{bmatrix} v^s_{ds} \\ v^s_{qs} \end{bmatrix} = \left( \begin{bmatrix} v^s_{dsf} \\ v^s_{qsf} \end{bmatrix} + \begin{bmatrix} v^s_{dsc} \\ v^s_{qsc} \end{bmatrix} \right) + \begin{bmatrix} v^s_{dsc} \\ v^s_{qsc} \end{bmatrix} \quad (3)$$

$$\approx \left( \begin{bmatrix} v^s_{dsf} \\ v^s_{qsf} \end{bmatrix} + L_S \frac{1}{\Delta T} \begin{bmatrix} \Delta i^s_{dsc} \\ \Delta i^s_{qsc} \end{bmatrix} \right) + L_S \frac{1}{\Delta T} \begin{bmatrix} \Delta i^s_{dsi} \\ \Delta i^s_{qsi} \end{bmatrix}$$

$$= \begin{bmatrix} v^s_{dsf} \\ v^s_{qsf} \end{bmatrix} + \begin{bmatrix} v^s_{dsh} \\ v^s_{qsh} \end{bmatrix}$$

$$= \begin{bmatrix} v^s_{dsf} \\ v^s_{qsf} \end{bmatrix} + L_S \frac{1}{\Delta T} \begin{bmatrix} \Delta i^s_{dsh} \\ \Delta i^s_{qsh} \end{bmatrix}$$

In Equation 3, $\Delta i^s_{dsc}$ denotes a $d^s$-axis current variation of the control frequency component, $\Delta i^s_{qsc}$ denotes a $q^s$-axis current variation of the control frequency component, $\Delta i^s_{dsi}$ denotes a $d^s$-axis current variation by the $d^s$-axis injection voltage $v^s_{dsi}$, $\Delta i^s_{qs}$, denotes a $q^s$-axis current variation by the $q^s$-axis injection voltage $v^s_{qsi}$, $v^s_{dsh}$ denotes a $d^s$-axis control voltage of a high frequency component, which is a result of adding the $d^s$-axis control voltage $v^s_{dsc}$ of the control frequency component to the $d^s$-axis injection voltage $v^s_{dsi}$, $\Delta i^s_{dsh}$ denotes a $d^s$-axis current variation of the high frequency component, which is a result of adding the $d^s$-axis current variation of the control frequency component $\Delta i^s_{dsi}$ to the $d^s$-axis current variation $\Delta i^s_{dsi}$ by the $d^s$-axis injection voltage $v^s_{dsi}$ and $\Delta i^s_{qsh}$ denotes a $q^s$-axis current variation of the high frequency component, which is a result of adding the $q^s$-axis current variation $\Delta i^s_{qsc}$ of the control frequency component to the $q^s$-axis current variation $\Delta i^s_{qsi}$ by the $q^s$-axis injection voltage $v^s_{qsi}$.

Thus, Equation 4 can be derived by adding a subscript "1" indicating the first unit period to Equations 2 and 3, and Equation 5 can be derived by adding a subscript "2" indicating the second unit period to Equations 2 and 3.

$$\begin{bmatrix} v^s_{ds1} \\ v^s_{qs1} \end{bmatrix} = \begin{bmatrix} v^s_{dsf1} \\ v^s_{qsf1} \end{bmatrix} + \begin{bmatrix} v^s_{dsh1} \\ v^s_{qsh1} \end{bmatrix} = \quad (4)$$

$$R_s \begin{bmatrix} i^s_{dsf1} \\ i^s_{qsf1} \end{bmatrix} + \omega_r \left( L_C \begin{bmatrix} i^s_{dsf1} \\ i^s_{qsf1} \end{bmatrix} + \lambda_f \begin{bmatrix} -\sin\theta_r \\ \cos\theta_r \end{bmatrix} \right) + L_S \frac{1}{\Delta T} \begin{bmatrix} \Delta i^s_{dsh1} \\ \Delta i^s_{qsh1} \end{bmatrix}$$

$$\begin{bmatrix} v^s_{ds2} \\ v^s_{qs2} \end{bmatrix} = \begin{bmatrix} v^s_{dsf2} \\ v^s_{qsf2} \end{bmatrix} + \begin{bmatrix} v^s_{dsh2} \\ v^s_{qsh2} \end{bmatrix} = \quad (5)$$

$$R_s \begin{bmatrix} i^s_{dsf2} \\ i^s_{qsf2} \end{bmatrix} + \omega_r \left( L_C \begin{bmatrix} i^s_{dsf2} \\ i^s_{qsf2} \end{bmatrix} + \lambda_f \begin{bmatrix} -\sin\theta_r \\ \cos\theta_r \end{bmatrix} \right) + L_S \frac{1}{\Delta T} \begin{bmatrix} \Delta i^s_{dsh2} \\ \Delta i^s_{qsh2} \end{bmatrix}$$

By subtracting Equation 5 from Equation 4, a control voltage difference value of the high frequency component and a current variation difference value between the first unit period and the second unit period can be obtained because signal injection and signal processing are performed in every current control sampling period (represented by a frequency of several KHz to tens KHz), and an operating frequency of a motor to which the low-speed sensorless driving is applied, i.e., the basic frequency, is a low frequency below 5 Hz. That is, a component corresponding to the basic frequency is hardly changed. This is represented by Equation 6.

$$\begin{bmatrix} v^s_{ds2} - v^s_{ds1} \\ v^s_{qs2} - v^s_{qs1} \end{bmatrix} = \begin{bmatrix} v^s_{dsh2} - v^s_{dsh1} \\ v^s_{qsh2} - v^s_{qsh1} \end{bmatrix} = L_S \frac{1}{\Delta T} \begin{bmatrix} \Delta i^s_{dsh2} - \Delta i^s_{dsh1} \\ \Delta i^s_{qsh2} - \Delta i^s_{qsh1} \end{bmatrix} \quad (6)$$

$$\left( \begin{bmatrix} v^s_{dsf1} \\ v^s_{qsf1} \end{bmatrix} \approx \begin{bmatrix} v^s_{dsf2} \\ v^s_{qsf2} \end{bmatrix}, \begin{bmatrix} i^s_{dsf1} \\ i^s_{qsf1} \end{bmatrix} \approx \begin{bmatrix} i^s_{dsf2} \\ i^s_{qsf2} \end{bmatrix} \right)$$

A result of Equation 6 is extended. That is, 2 voltage difference vectors $v_{dqs32}$ and $v_{dqs21}$ are calculated using 3 temporally continuous voltage vectors $v_{dqs1S}$ $v_{dqs2S}$ and $v_{dqs3S}$ and 2 current variation difference vectors $\Delta i_{dqs32}$ and $\Delta i_{dqs21}$ are calculated using 3 corresponding current variation vectors $\Delta i_{dqsh1}$, $\Delta i_{dqsh2}$, and $\Delta i_{dqsh3}$. That is, Equation 7 can be established.

$$\begin{bmatrix} v^s_{ds32} & v^s_{ds21} \\ v^s_{qs32} & v^s_{qs21} \end{bmatrix} = \begin{bmatrix} v^s_{ds3} - v^s_{ds2} & v^s_{ds2} - v^s_{ds1} \\ v^s_{qs3} - v^s_{qs2} & v^s_{qs2} - v^s_{qs1} \end{bmatrix} = \quad (7)$$

$$L_S \frac{1}{\Delta T} \begin{bmatrix} \Delta i^s_{dsh3} - \Delta i^s_{dsh2} & \Delta i^s_{dsh2} - \Delta i^s_{dsh1} \\ \Delta i^s_{qsh3} - \Delta i^s_{qsh2} & \Delta i^s_{qsh2} - \Delta i^s_{qsh1} \end{bmatrix} \equiv L_S \frac{1}{\Delta T} \begin{bmatrix} \Delta i^s_{dsh32} & \Delta i^s_{dsh21} \\ \Delta i^s_{qsh32} & \Delta i^s_{qsh21} \end{bmatrix}$$

When the voltage equation of Equation 1 and the voltage/current vector relational equation of Equation 7 are used, four matrix variables $L_{11}$, $L_{12}$, $L_{21}$, and $L_{22}$ of the inductance matrix $L_S$ can be obtained using a matrix equation according to the inductance matrix $L_S$ including the four matrix variables $L_{11}$, $L_{12}$, $L_{21}$, and $L_{22}$, a voltage matrix including four voltage difference values $v^s_{ds32}$, $v^s_{ds21}$, $v^s_{qs32}$, $v^s_{qs21}$, and a current matrix including four current variation difference values $\Delta i^s_{ds32}$, $\Delta i^s_{ds21}$, $\Delta i^s_{qs32}$, and $\Delta i^s_{qs21}$. This can be represented by Equation 8.

$$L_S = \begin{bmatrix} L_0 + L_1\cos2\theta_r & L_1\sin2\theta_r \\ L_1\sin2\theta_r & L_0 - L_1\cos2\theta_r \end{bmatrix} = \quad (8)$$

$$\Delta T \begin{bmatrix} v^s_{ds32} & v^s_{ds21} \\ v^s_{qs32} & v^s_{qs21} \end{bmatrix} \begin{bmatrix} \Delta i^s_{dsh32} & \Delta i^s_{dsh21} \\ \Delta i^s_{qsh32} & \Delta i^s_{qsh21} \end{bmatrix}^{-1} = \begin{bmatrix} L_{11} & L_{12} \\ L_{21} & L_{22} \end{bmatrix}$$

That is, when a calculation result of the rotator angle $\hat{\theta}_r$ in the control injection period Tci is $\hat{\theta}_{rCal}$ Equation 9 can be derived from Equation 8.

$$2\hat{\theta}_{rCal} = \tan^{-1}\left( \frac{L_{12} + L_{21}}{L_{11} - L_{22}} \right) \quad (9)$$

Figure 5:
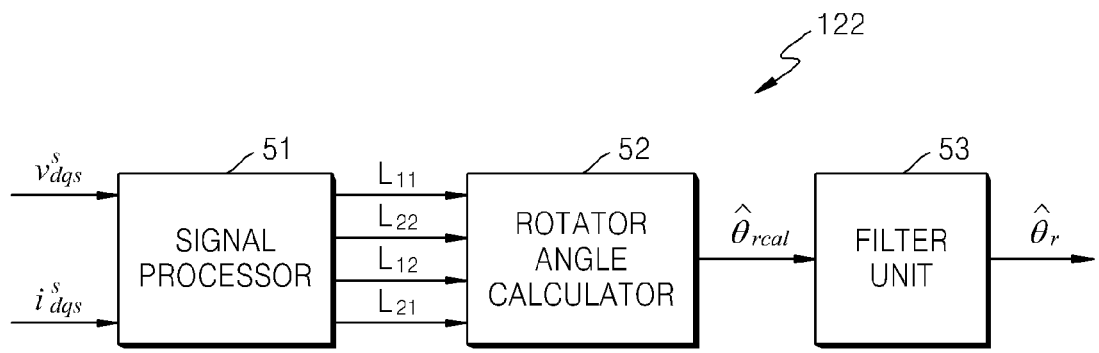
FIG. 5 is a block diagram of a rotator location detector in the apparatus of FIG. 1.

FIG. 5 is a block diagram of the rotator location detector 122 in the apparatus of FIG. 1.

Referring to FIGS. 3 and 5, the rotator location detector 122 includes a signal processor 51.

The signal processor 51 obtains a difference value $v^s_{ds32}$ between a third $d^s$-axis voltage $v^s_{ds3}$ and a second $d^s$-axis voltage $v^s_{ds2}$, a difference value $v^s_{ds21}$ between the second $d^s$-axis voltage $v^s_{ds2}$ and a first $d^s$-axis voltage $v^s_{ds1}$, a difference value $v^s_{qs32}$ between a third $q^s$-axis voltage $v^s_{qs3}$ and a second $q^s$-axis voltage $v^s_{qs2}$, a difference value $v^s_{qs21}$ between the second $q^s$-axis voltage $v^s_{qs2}$ and a first $q^s$-axis voltage $v^s_{qs1}$, a difference value $\Delta i^s_{ds32}$ between a $d^s$-axis current variation $\Delta i^s_{ds3}$ in the third unit period ($t_2$ to $t_3$) and a $d^s$-axis current variation $\Delta i^s_{ds2}$ in the second unit period ($t_1$ to $t_2$), a difference value $\Delta i^s_{ds21}$ between the $d^s$-axis current variation $\Delta i^s_{ds2}$ in the second unit period ($t_1$ to $t_2$) and a $d^s$-axis current variation $\Delta i^s_{ds1}$ in the first unit period ($t_0$ to $t_1$), a difference value $\Delta i^s_{qs32}$ between a $q^s$-axis current variation $\Delta i^s_{qs3}$ in the third unit period ($t_2$ to $t_3$) and a $q^s$-axis current variation $\Delta i^s_{qs2}$ in the second unit period ($t_1$ to $t_2$), and a difference value $\Delta i^s_{qs21}$ between the $q^s$-axis current variation $\Delta i^s_{qs2}$ in the second unit period ($t_1$ to $t_2$) and a $q^s$-axis current variation $\Delta i^s_{qs1}$ in the first unit period ($t_0$ to $t_1$) in the control injection period Tci (refer to Equation 8).

In addition, the signal processor 51 may obtain the four matrix variables $L_{11}$, $L_{12}$, $L_{21}$, and $L_{22}$ of the inductance matrix $L_S$ by using Equation 8, which is a matrix equation according to the inductance matrix $L_S$ including the four matrix variables $L_{11}$, $L_{12}$, $L_{21}$, and $L_{22}$, the voltage matrix including the four voltage difference values $v^s_{ds32}$, $v^s_{ds21}$, $v^s_{qs32}$, $v^s_{qs21}$, and the current matrix including the four current variation difference values $\Delta i^s_{ds32}$, $\Delta i^s_{ds21}$, $\Delta i^s_{qs32}$, and $\Delta i^s_{qs21}$.

The rotator location detector 122 further includes a rotator angle calculator 52 and a filter unit 53.

The rotator angle calculator 52 calculates the rotator angle $\hat{\theta}_{rCal}$ in a current control injection period Tci by substituting values of the four matrix variables $L_{11}$, $L_{12}$, $L_{21}$, and $L_{22}$ into Equation 9.

The filter unit 53 finally obtains the rotator angle $\hat{\theta}_r$ by canceling a signal noise component from the rotator angle $\hat{\theta}_{rCal}$ input from the rotator angle calculator 52 and provides the finally obtained rotator angle $\hat{\theta}_r$ to the second feedback current transformer 1212 and the control voltage transformer 1217 in the driving controller 121.

Figure 6:
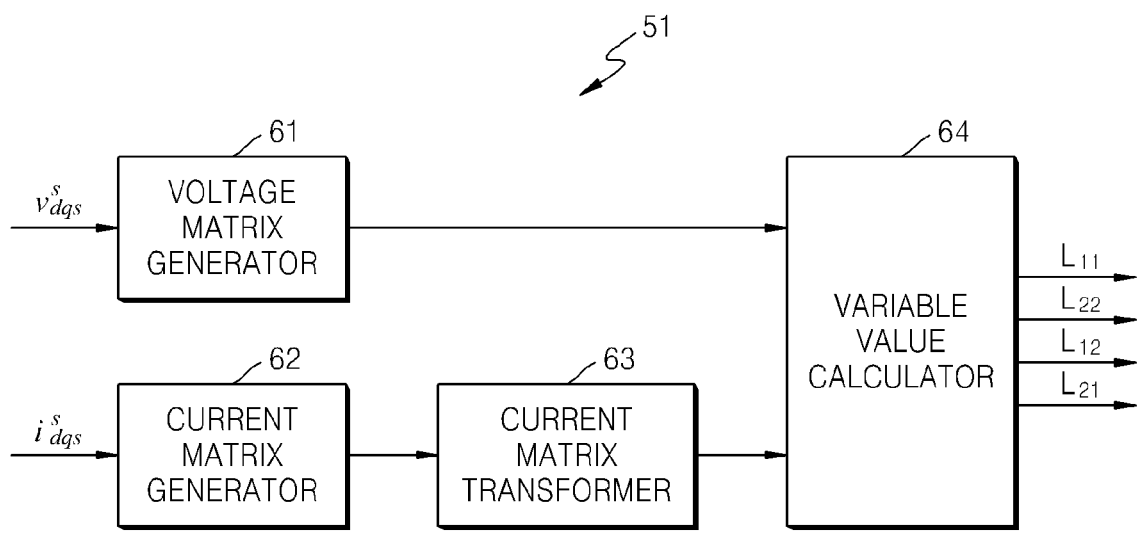
FIG. 6 is a block diagram of a signal processor in the rotator location detector of FIG. 5.

FIG. 6 is a block diagram of the signal processor 51 in the rotator location detector 122 of FIG. 5.

Referring to FIGS. 1, 3, 5, and 6, the signal processor 51 includes a voltage matrix generator 61, a current matrix generator 62, a current matrix transformer 63, and a variable value calculator 64.

The voltage matrix generator 61 obtains the voltage matrix including the four voltage difference values $v^s_{ds32}$, $v^s_{ds21}$, $v^s_{qs32}$, $v^s_{qs21}$ in the control injection period Tci by receiving the applied voltages $v^s_{dqs}$ from the second voltage adder 1219 in the driving controller 121 and calculating the difference value $v^s_{ds32}$ between the third $d^s$-axis voltage $v^s_{ds3}$ and the second $d^s$-axis voltage $v^s_{ds2}$, the difference value $v^s_{ds21}$ between the second $d^s$-axis voltage $v^s_{ds2}$ and the first $d^s$-axis voltage $v^s_{ds1}$, the difference value $v^s_{qs32}$ between the third $q^s$-axis voltage $v^s_{qs3}$ and the second $q^s$-axis voltage $v^s_{qs2}$, and the difference value $v^s_{qs21}$ between the second $q^s$-axis voltage $v^s_{qs2}$ and the first $q^s$-axis voltage $v^s_{qs1}$ (refer to Equation 8).

The current matrix generator 62 obtains the current matrix including the four current variation difference values $\Delta i^s_{ds32}$, $\Delta i^s_{ds21}$, $\Delta i^s_{qs32}$, and $\Delta i^s_{qs21}$ in the control injection period Tci by receiving the $d^s$- and $q^s$-axes driving currents $i^s_{dqs}$ from the first feedback current transformer 1211 in the driving controller 121 and calculating the difference value $\Delta i^s_{ds32}$ between the $d^s$-axis current variation $\Delta i^s_{ds3}$ in the third unit period ($t_2$ to $t_3$) and the $d^s$-axis current variation $\Delta i^s_{ds2}$ in the second unit period ($t_1$ to $t_2$), the difference value $\Delta i^s_{ds21}$ between the $d^s$-axis current variation $\Delta i^s_{ds2}$ in the second unit period ($t_1$ to $t_2$) and the $d^s$-axis current variation $\Delta i^s_{ds1}$ in the first unit period ($t_0$ to $t_1$), the difference value $\Delta i^s_{qs32}$ between the $q^s$-axis current variation $\Delta i^s_{qs3}$ in the third unit period ($t_2$ to $t_3$) and the $q^s$-axis current variation $\Delta i^s_{qs2}$ in the second unit period ($t_1$ to $t_2$), and the difference value $\Delta i^s_{qs21}$ between the $q^s$-axis current variation $\Delta i^s_{qs2}$ in the second unit period ($t_1$ to $t_2$) and the $q^s$-axis current variation $\Delta i^s_{qs1}$ in the first unit period ($t_0$ to $t_1$) (refer to Equation 8).

The current matrix transformer 63 obtains an inverse matrix of the current matrix input from the current matrix generator 62 (refer to Equation 8).

The variable value calculator 64 obtains the four matrix variables $L_{11}$, $L_{12}$, $L_{21}$, and $L_{22}$ of the inductance matrix $L_S$ by using Equation 8, which is a matrix equation according to the inductance matrix $L_S$ including the four matrix variables $L_{11}$, $L_{12}$, $L_{21}$, and $L_{22}$, the voltage matrix input from the voltage matrix generator 61, and the current inverse-matrix input from the current matrix transformer 63.

As described above, according to the first exemplary embodiment, by sequentially applying different $d^s$-axis voltages and different $q^s$-axis voltages in a control injection period, current variation difference values corresponding to the applied voltages and difference values between the applied voltages may be obtained. In addition, a rotator angle in the control injection period may be obtained by using a matrix equation according to an inductance matrix of an AC motor, a voltage matrix including voltage difference values, and a current matrix including current variation difference values.

Thus, a rotator location can be internally detected without using an additional rotator location detecting apparatus such as a resolver, thereby reducing a size and unit manufacturing cost of an apparatus for driving the AC motor.

Figure 7:
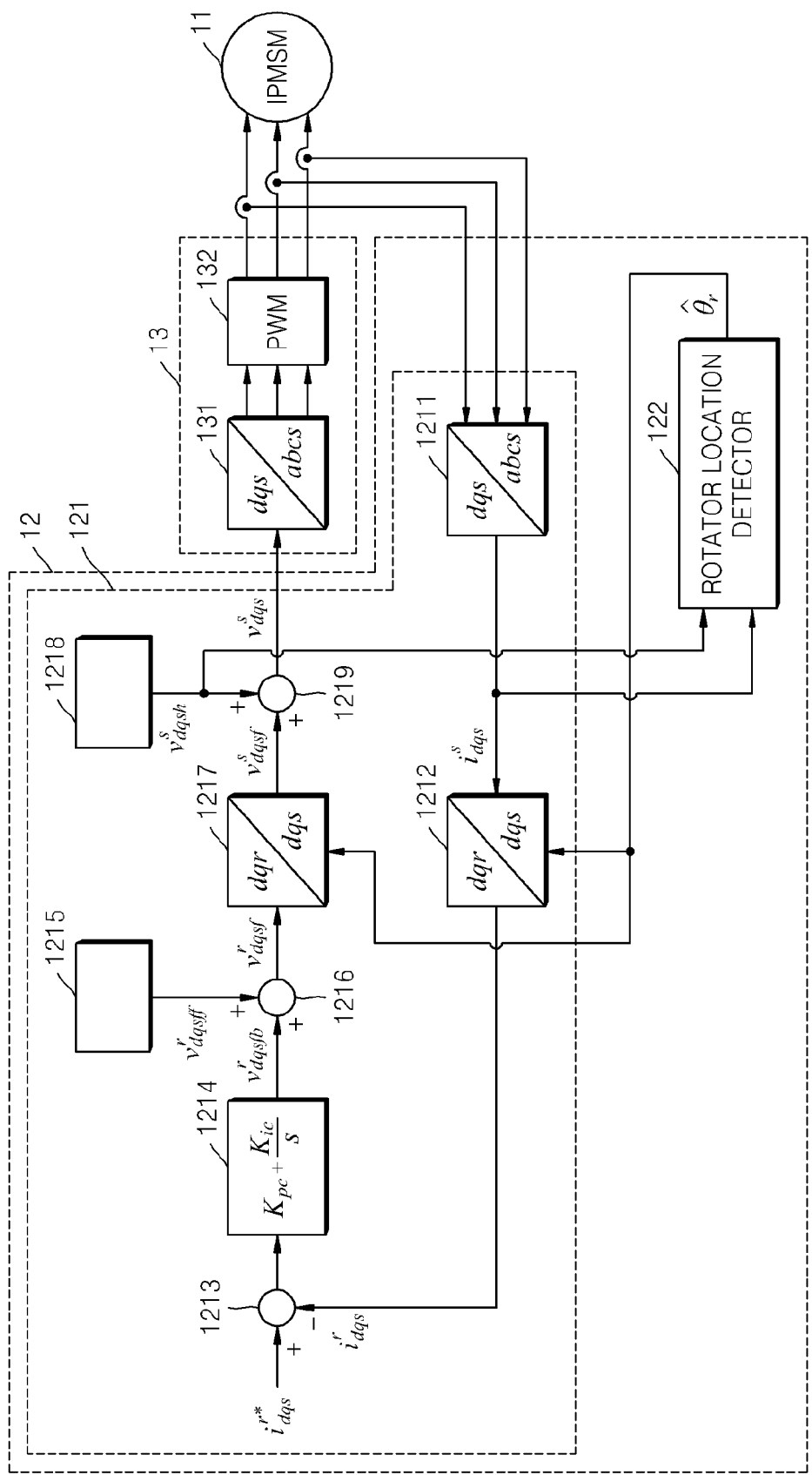
FIG. 7 is a block diagram for describing a method and apparatus for driving an AC motor according to a second exemplary embodiment.

FIG. 7 is a block diagram for describing a method and apparatus for driving an AC motor according to a second exemplary embodiment.

Figure 8:
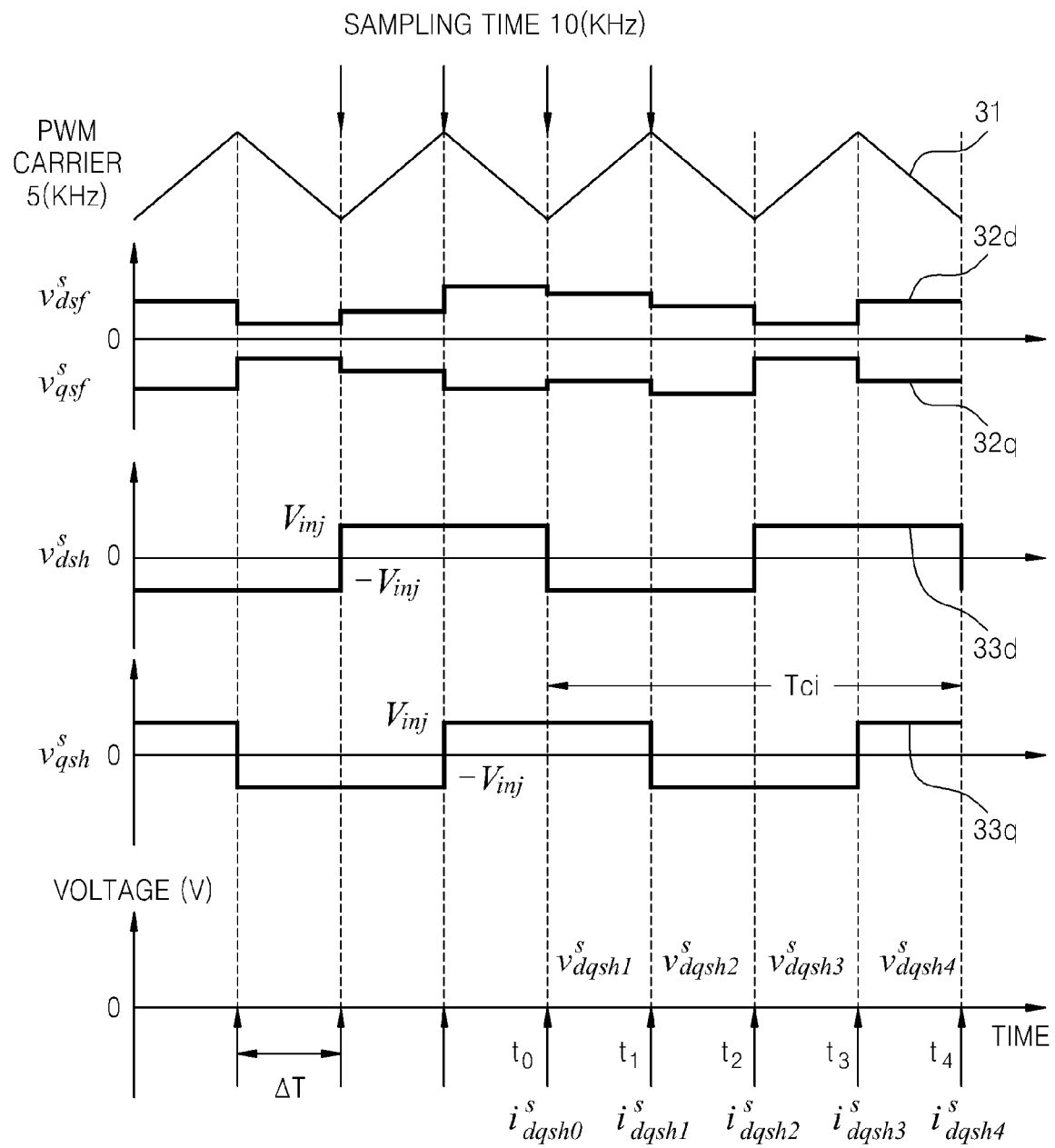
FIG. 8 is a timing diagram showing a $d^s$-axis control voltage value $v^s_{dsf}$ and a $q^s$-axis control voltage value $v^s_{qsf}$ from a control voltage transformer and an additional $d^s$-axis injection voltage value $v^s_{dsh}$ and an additional $q^s$-axis injection voltage value $v^s_{qsh}$ from an injection voltage generator according to a control period of a PWM carrier signal in the apparatus of FIG. 7.

FIG. 8 is a timing diagram showing a $d^s$-axis control voltage value $v^s_{dsf}$ and a $q^s$-axis control voltage value $v^s_{qsf}$ from a control voltage transformer and an additional $d^s$-axis injection voltage value $v^s_{dsh}$ and an additional $q^s$-axis injection voltage value $v^s_{qsh}$ from an injection voltage generator according to a control period of a PWM carrier signal in the apparatus of FIG. 7.

Figure 9:
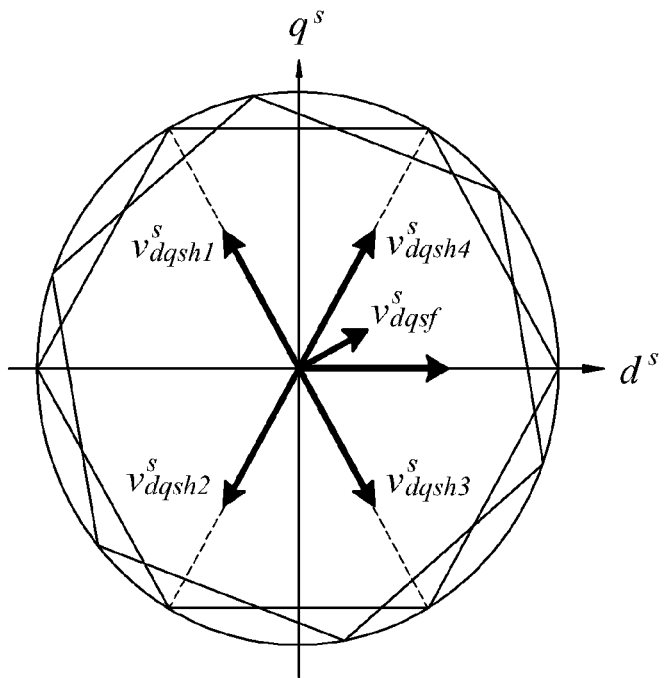
FIG. 9 is a vector diagram showing that first $d^s$- and $q^s$-axes injection voltages $v^s_{dqsh1}$, second $d^s$- and $q^s$-axes injection voltages $v^s_{dqsh2}$, and third $d^s$- and $q^s$-axes injection voltages $v^s_{dqsh3}$, and fourth $d^s$- and $q^s$-axes injection voltages $v^s_{dqsh4}$ are generated on a unit period basis with respect to the $d^s$- and $q^s$-axes control voltage values $v^s_{dqsf}$ of FIG. 8 in a control injection period.

FIG. 9 is a vector diagram showing that first $d^s$- and $q^s$-axes injection voltages $v^s_{dqsh1}$, second $d^s$- and $q^s$-axes injection voltages $v^s_{dqsh2}$, and third $d^s$- and $q^s$-axes injection voltages $v^s_{dqsh3}$, and fourth $d^s$- and $q^s$-axes injection voltages $v^s_{dqsh4}$ are generated on a unit period basis with respect to the $d^s$- and $q^s$-axes control voltage values $v^s_{dqsf}$ of FIG. 8 in a control injection period.

Referring to FIGS. 7 to 9, the apparatus according to the second embodiment drives an AC motor 11 while periodically obtaining a rotator angle of the AC motor 11, e.g., an IPMSM, and includes a controller 12 and a driver 13.

The driver 13 drives the AC motor 11 according to voltages $v^s_{dqs}$ applied from the controller 12.

The controller 12 includes a driving controller 121 and a rotator location detector 122.

The driving controller 121 applies a $d^s$-axis voltage $v^s_{ds1}$ which is a voltage for an exciting current in a stationary reference frame dqs, and a $q^s$-axis voltage $v^s_{qs}$, which is a voltage for generating a rotational force in the stationary reference frame dqs, to the driver 13 while sequentially applying different $d^s$- and $q^s$-axes voltages $v^s_{dqs}$ in a control injection period Tci of FIG. 8.

In the second exemplary embodiment, the driving controller 121 applies a $d^s$-axis voltage $v^s_{ds1}$ which is a voltage for an exciting current in the stationary reference frame dqs, and a $q^s$-axis voltage $v^s_{qs}$, which is a voltage for generating a rotational force in the stationary reference frame dqs, to the driver 13 while sequentially and additionally applying 4 pairs of $d^s$- and $q^s$-axes injection voltages $v^s_{dqsh}$ having different polarity sets to the driver 13 in the control injection period Tci of FIG. 8.

The rotator location detector 122 obtains a rotator angle $\hat{\theta}_r$ by the $d^s$-axis voltage $v^s_{ds}$, the $q^s$-axis voltage $v^s_{qs}$, a $d^s$-axis current $i^s_{ds}$, and a $q^s$-axis current $i^s_{qs}$ in the control injection period Tci.

In the second exemplary embodiment, the rotator location detector 122 obtains the rotator angle $\hat{\theta}_r$ in a current unit period $\Delta T$ according to a result of subtracting a $d^S$-axis injection current $i^s_{dsh}$ in a previous unit period from a $q^s$-axis injection current $i^s_{qsh}$ in the current unit period $\Delta T$ and a result of adding a $d^S$-axis injection current $i^s_{dsh}$ in the current unit period $\Delta T$ to a $q^s$-axis injection current $i^s_{qsh}$ in the previous unit period, in the control injection period Tci.

That is, the rotator angle $\hat{\theta}_r$ in the current unit period $\Delta T$ can be obtained by substituting the subtracting result and the adding result into a relational equation between a voltage and a current by an inductance of the AC motor 11. This will be described in detail below.

Thus, a rotator location can be internally detected without using an additional rotator location detecting apparatus such as a resolver, thereby reducing a size and unit manufacturing cost the apparatus (12 and 13) for driving the AC motor 11.

When a three-phase AC voltage is applied to a stator of the AC motor 11, a rotator of the AC motor 11 rotates. The driver 13 includes a driving voltage transformer 131 and a PWM 132.

The driving voltage transformer 131 transforms the applied voltages $v^s_{dqs}$, which are the $d^s$-axis voltage $v^s_{ds}$ and the $q^s$-axis voltage $v^s_{qs}$ from the controller 12, to a three-phase AC voltage.

The PWM 132 applies the three-phase AC voltage from the driving voltage transformer 131 to the stator of the AC motor 11 via pulse width modulation.

The driving controller 121 includes a first feedback current transformer 1211, a second feedback current transformer 1212, a first current subtractor 1213, a proportional-integral controller 1214, a forward control voltage generator 1215, a first voltage adder 1216, a control voltage transformer 1217, an injection voltage generator 1218, and a second voltage adder 1219.

The first feedback current transformer 1211 obtains the $d^s$- and $q^s$-axes driving currents $i^s_{dqs}$ in the stationary reference frame dqs by detecting a three-phase driving current in a three-phase reference frame abcs, which flows through the stator of the AC motor 11.

The second feedback current transformer 1212 transforms the $d^s$- and $q^s$-axes driving currents $i^s_{dqs}$ in the stationary reference frame dqs, which are input from the first feedback current transformer 1211, to $d^s$- and $q^s$-axes driving currents $i^r_{dqs}$ in a synchronous reference frame dqr according to the rotator angle $\hat{\theta}_r$ input from the rotator location detector 122.

The first current subtractor 1213 generates error currents, which are difference values between $d^s$- and $q^s$-axes target currents $i^{r*}_{dqs}$ in the synchronous reference frame dqr and the $d^s$- and $q^s$-axes driving currents $i^r_{dqs}$ input from the second feedback current transformer 1212.

The proportional-integral controller 1214 obtains $d^s$- and $q^s$-axes feedback control voltages $v^r_{dqsfb}$ in the synchronous reference frame dqr by performing a proportional-integral control of the error currents input from the first current subtractor 1213.

The forward control voltage generator 1215 generates $d^s$- and $q^s$-axes forward control voltages $v^r_{dqsff}$ in the synchronous reference frame dqr, which conforms to unique characteristics of the AC motor 11.

The first voltage adder 1216 generates $d^s$- and $q^s$-axes control voltages $v^r_{dqsf}$ obtained by adding the $d^s$- and $q^s$-axes feedback control voltages $v^r_{dqsfb}$ input from the proportional-integral controller 1214 to the $d^s$- and $q^s$-axes forward control voltages $v^r_{dqsff}$ input from the forward control voltage generator 1215.

The control voltage transformer 1217 transforms the $d^s$- and $q^s$-axes control voltages $v^r_{dqsf}$ in the synchronous reference frame dqr, which are input from the first voltage adder 1216, to $d^s$- and $q^s$-axes control voltages $v^s_{dqsf}$ in the stationary reference frame dqs according to the input rotator angle $\hat{\theta}_r$.

The injection voltage generator 1218 for rotator location detection sequentially generates the 4 pairs of $d^s$- and $q^s$-axes injection voltages $v^s_{dqsh}$ having different polarity sets in the control injection period Tci.

A control injection frequency, which is an inverse value of the control injection period Tci, is preferably ½ a switching frequency of the PWM 132.

For example, when the switching frequency of the PWM 132 is 5 KHz and the proportional-integral controller 1214 performs double sampling, a sampling frequency of the proportional-integral controller 1214 is 10 KHz, and the control injection frequency is about 2.5 KHz (refer to FIGS. 8 and 9).

As such, by using a relatively low control injection frequency, there is an additional effect that a response performance of the proportional-integral controller 1214 can increase.

The second voltage adder 1219 provides the applied voltages $v^s_{dqs}$ obtained by adding the $d^s$- and $q^s$-axes control voltages $v^s_{dqsf}$ in the stationary reference frame dqs, which are input from the control voltage transformer 1217, to the $d^s$- and $q^s$-axes injection voltages $v^s_{dqsh}$ in the stationary reference frame dqs, which are input from the injection voltage generator 1218, to the driving voltage transformer 131 of the driver 13.

In the control injection period Tci, first $d^s$- and $q^s$-axes injection voltages $v^s_{dqsh1}$ are applied in a first unit period (a sampling period $\Delta T$, $t_0$ to $t_1$, of FIG. 8), second $d^s$- and $q^s$-axes injection voltages $v^s_{dqsh2}$ are applied in a second unit period ($t_1$ to $t_2$), third $d^s$- and $q^s$-axes injection voltages $v^s_{dqsh3}$ are applied in a third unit period ($t_2$ to $t_3$), and fourth $d^s$- and $q^s$-axes injection voltages $v^s_{dqsh4}$ are applied in a fourth unit period ($t_3$ to $t_4$).

Hereinafter, an operational principle of the rotator location detector 122 of FIG. 7 is described with equations.

As described above, voltage equations of the three-phase AC motor 11 in a stationary reference frame are represented by Equation 1.

Thus, a relational equation between a voltage and a current by an inductance can be induced by Equation 10.

$$v^s_{dqs} = R_s i^s_{dqs} + L_s \frac{d}{dt}\begin{bmatrix} i^s_{ds} \\ i^s_{qs} \end{bmatrix} + \lambda_f \begin{bmatrix} -\omega_r \sin\theta_r \\ \omega_r \cos\theta_r \end{bmatrix} + 2\omega_r \Delta L \begin{bmatrix} -\sin2\theta_r & \cos2\theta_r \\ \cos2\theta_r & \sin2\theta_r \end{bmatrix} i^s_{dqs} \quad (10)$$

In Equation 10, $\omega_r$ denotes a rotator angular velocity, $v^s_{dqs}$ denotes $d^s$- and $q^s$-axes control voltages, $i^s_{dqs}$ denotes $d^s$- and $q^s$-axes currents, $i^s_{qsf}$ denotes a $q^s$-axis current of the basic frequency component, $i^s_{ds}$ denotes a $d^s$-axis current, and $i^s_{qs}$ denotes a $q^s$-axis current.

A frequency of the $d^s$- and $q^s$-axes injection voltages $v^s_{dqsh}$ in the stationary reference frame dqs, which are output from the injection voltage generator 1218, is much higher than a frequency of the $d^s$- and $q^s$-axes control voltages $v^s_{dqsf}$ in the stationary reference frame dqs, which are output from the control voltage transformer 1217.

That is, when all terms except for the second term of the right side of Equation 10 are removed, a relational equation between the $d^s$- and $q^s$-axes injection voltages $v^s_{dqsh}$ in the stationary reference frame dqs and $d^s$- and $q^s$-axes injection currents $i^s_{dqsh}$ in the stationary reference frame dqs is obtained. Thus, when the inductance matrix $L_S$ of Equation 1 is substituted into this relational equation, Equation 11 can be derived.

$$V^s_{dqsh} = \begin{bmatrix} \Sigma L + \Delta L \cos 2\theta_r & \Delta L \sin 2\theta_r \\ \Delta L \sin 2\theta_r & \Sigma L - \Delta L \cos 2\theta_r \end{bmatrix} \frac{d}{dt} \begin{bmatrix} i^s_{dsh} \\ i^s_{qsh} \end{bmatrix} \quad (11)$$

In addition, when Equation 11 is arranged for the injection currents $i^s_{dqsh}$, Equation 12 is established.

$$\begin{bmatrix} i^s_{dsh} \\ i^s_{qsh} \end{bmatrix} = \int \frac{1}{\Sigma L^2 - \Delta L^2} \begin{bmatrix} \Sigma L - \Delta L \cos 2\theta_r & -\Delta L \sin 2\theta_r \\ -\Delta L \sin 2\theta_r & \Sigma L + \Delta L \cos 2\theta_r \end{bmatrix} \begin{bmatrix} V^s_{dsh} \\ V^s_{qsh} \end{bmatrix} dt \quad (12)$$

In the second embodiment, when a $d^s$-axis injection voltage $v^s_{dsh}$ is a sine function of time t, a $q^s$-axis injection voltage $v^s_{qsh}$ is a cosine function of time t. That is, the $d^s$- and $q^s$-axes injection voltages $v^s_{dqsh}$ in the stationary reference frame dqs, which are input from the injection voltage generator 1218, can be obtained by Equation 13 (refer to FIGS. 8 and 9).

$$v^s_{dqsh} = V_{inj} \begin{bmatrix} -\sin \omega_h t \\ \cos \omega_h t \end{bmatrix} \quad (13)$$

In Equation 13, $V_{inj}$ denotes a magnitude of the $d^s$- and $q^s$-axes injection voltages $v^s_{dqsh}$, and $\omega_h$ denotes an angular velocity of the injection voltage $v^s_{dqsh}$.

When Equation 13 is substituted into Equation 12, a $d^s$-axis injection current $i^s_{dsh}$ can be obtained from a cosine component ($\cos 2\theta_r$) of two times a rotator angle ($2\theta_r$), and a $q^s$-axis injection current $i^s_{qsh}$ can be obtained from a sine component ($\sin 2\theta_r$) of two times the rotator angle ($2\theta_r$). That is, Equation 14 can be derived.

$$\begin{bmatrix} i^s_{dsh} \\ i^s_{qsh} \end{bmatrix} = \frac{V_{inj}}{\Sigma L^2 - \Delta L^2} \begin{bmatrix} \frac{\Sigma L}{\omega_h} \cos \omega_h t + \frac{\Delta L}{2\omega_r - \omega_h} \cos(2\theta_r - \omega_h t) \\ \frac{\Sigma L}{\omega_h} \sin \omega_h t + \frac{\Delta L}{2\omega_r - \omega_h} \sin(2\theta_r - \omega_h t) \end{bmatrix} \quad (14)$$

The control injection period Tci includes the first unit period ($t_0$ to $t_1$ of FIG. 8), the second unit period ($t_1$ to $t_2$), the third unit period ($t_2$ to $t_3$), and the fourth unit period ($t_3$ to $t_4$). A voltage injection time in the first unit period ($t_0$ to $t_1$ of FIG. 8) is $t_0$, a voltage injection time in the second unit period ($t_1$ to $t_2$) is $t_1$, a voltage injection time in the third unit period ($t_2$ to $t_3$) is $t_2$, and a voltage injection time in the fourth unit period ($t_3$ to $t_4$) is $t_3$.

Thus, in Equation 14, the time when a result $\omega_h t$ of multiplying the angular velocity $6\omega_h$ of the injection voltage $v^s_{dqsh}$ by time t is zero (0) corresponds to the first unit period ($t_0$ to $t_1$ of FIG. 8), the time when a result $\omega_h t$ of multiplying the angular velocity $\omega_h$ of the injection voltage $v^s_{dqsh}$ by time t is π/2 corresponds to the second unit period ($t_1$ to $t_2$ of FIG. 8), the time when a result $\omega_h t$ of multiplying the angular velocity $\omega_h$ of the injection voltage $v^s_{dqsh}$ by time t is π corresponds to the third unit period ($t_2$ to $t_3$ of FIG. 8), and the time when a result $\omega_h t$ of multiplying the angular velocity $\omega_h$ of the injection voltage $v^s_{dqsh}$ by time t is 3π/2 corresponds to the fourth unit period ($t_3$ to $t_4$ of FIG. 8).

Accordingly, an equation of calculating the $d^s$-axis injection current $i^s_{dsh}$ and the $q^s$-axis injection current $i^s_{qsh}$ in the first unit period ($t_0$ to $t_1$ of FIG. 8) can be represented by Equation 15.

$$\begin{bmatrix} i^s_{dsh1} \\ i^s_{qsh1} \end{bmatrix} = \frac{V_{inj}}{\Sigma L^2 - \Delta L^2} \begin{bmatrix} \frac{\Sigma L}{\omega_h} + \frac{\Delta L}{2\omega_r - \omega_h} \cos(2\theta_r) \\ \frac{\Delta L}{2\omega_r - \omega_h} \sin(2\theta_r) \end{bmatrix}, \quad (15)$$

when $$\omega_h t = 0$$

In addition, an equation of calculating the $d^s$-axis injection current $i^s_{dsh}$ and the $q^s$-axis injection current $i^s_{qsh}$ in the second unit period ($t_1$ to $t_2$ of FIG. 8) can be represented by Equation 16.

$$\begin{bmatrix} i^s_{dsh2} \\ i^s_{qsh2} \end{bmatrix} = \frac{V_{inj}}{\Sigma L^2 - \Delta L^2} \begin{bmatrix} \frac{\Delta L}{2\omega_r - \omega_h} \sin(2\theta_r) \\ \frac{\Sigma L}{\omega_h} - \frac{\Delta L}{2\omega_r - \omega_h} \cos(2\theta_r) \end{bmatrix}, \quad (16)$$

when $$\omega_h t = \frac{1}{2}\pi$$

In addition, an equation of calculating the $d^s$-axis injection current $i^s_{dsh}$ and the $q^s$-axis injection current $i^s_{qsh}$ in the third unit period ($t_2$ to $t_3$ of FIG. 8) can be represented by Equation 17.

$$\begin{bmatrix} i^s_{dsh3} \\ i^s_{qsh3} \end{bmatrix} = \frac{V_{inj}}{\Sigma L^2 - \Delta L^2} \begin{bmatrix} -\frac{\Sigma L}{\omega_h} - \frac{\Delta L}{2\omega_r - \omega_h} \cos(2\theta_r) \\ -\frac{\Delta L}{2\omega_r - \omega_h} \sin(2\theta_r) \end{bmatrix}, \quad (17)$$

when $$\omega_h t = \pi$$

In addition, an equation of calculating the $d^s$-axis injection current $i^s_{dsh}$ and the $q^s$-axis injection current $i^s_{qsh}$ in the fourth unit period ($t_3$ to $t_4$ of FIG. 8) can be represented by Equation 18.

$$\begin{bmatrix} i^s_{dsh4} \\ i^s_{qsh4} \end{bmatrix} = \frac{V_{inj}}{\Sigma L^2 - \Delta L^2} \begin{bmatrix} -\frac{\Delta L}{2\omega_r - \omega_h} \sin(2\theta_r) \\ -\frac{\Sigma L}{\omega_h} + \frac{\Delta L}{2\omega_r - \omega_h} \cos(2\theta_r) \end{bmatrix}, \quad (18)$$

when $$\omega_h t = \frac{3}{2}\pi$$

When Equations 15 to 18 are used, a subtraction equation and an addition equation may be commonly set between a previous unit period and a current unit period. In addition, when measured injection currents are substituted into the subtraction equation and the addition equation, the cosine component ($\cos 2\theta_r$) and the sine component ($\sin 2\theta_r$) of two times the rotator angle ($2\theta_r$) may be obtained, and a rotator angle θ_r in a current unit period may be obtained from the cosine component (cos 2θ_r) and the sine component (sin 2θ_r).

The subtraction equation and the addition equation between a previous unit period and a current unit period can be set by Equation 19.

$$\begin{bmatrix} i^s_{qsh1} + i^s_{dsh2} \\ i^s_{dsh1} - i^s_{qsh2} \end{bmatrix} = \begin{bmatrix} i^s_{dsh2} - i^s_{qsh3} \\ -i^s_{qsh2} - i^s_{dsh3} \end{bmatrix} = \begin{bmatrix} -i^s_{dsh3} - i^s_{qsh4} \\ -i^s_{qsh3} + i^s_{dsh4} \end{bmatrix} = \qquad (19)$$

$$\begin{bmatrix} -i^s_{dsh4} + i^s_{qsh1} \\ i^s_{qsh4} + i^s_{dsh1} \end{bmatrix} = \frac{2V_{inj}}{\Sigma L^2 - \Delta L^2} \begin{bmatrix} \frac{\Delta L}{2\omega_r - \omega_h} \sin(2\theta_r) \\ \frac{\Delta L}{2\omega_r - \omega_h} \cos(2\theta_r) \end{bmatrix} =$$

$$\frac{2V_{inj}}{\Sigma L^2 - \Delta L^2} \frac{\Delta L}{2\omega_r - \omega_h} \begin{bmatrix} \sin(2\theta_r) \\ \cos(2\theta_r) \end{bmatrix}$$

Summarizing Equation 19, two operations below are previously performed to calculate the cosine component (cos 2θ_r) and the sine component (sin 2θ_r) of two times the rotator angle (2θ_r).

First, a $d^s$-axis injection current $i^s_{dsh}(j)$ in a previous unit period is subtracted from a $q^s$-axis injection current $i^s_{qsh}(j+1)$ in a current unit period, and a subtraction result is multiplied by a polarity (+ or −) of a $d^s$-axis injection voltage, thereby generating data Dat1 of the subtraction result.

Second, a $q^s$-axis injection current $i^s_{qsh}(j)$ in the previous unit period is added to a $d^s$-axis injection current $i^s_{dsh}(j+1)$ in the current unit period, and an addition result is multiplied by a polarity (+ or −) of a $q^s$-axis injection voltage, thereby generating data Dat2 of the addition result.

Table 1 summarizes a polarity sign($v^s_{dsh}$) of the $d^s$-axis injection voltage, a polarity sign($v^s_{qsh}$) of the $q^s$-axis injection voltage, equations of calculating the sine component (sin 2θ_r), and equations of calculating the cosine component (cos 2θ_r) in the four unit periods.

TABLE 1

|  | First unit period | Second unit period | Third unit period | Fourth unit period |
|---|---|---|---|---|
| sign ($v^s_{dsh}$) | − | − | + | + |
| sign ($v^s_{qsh}$) | + | − | − | + |
| sin 2θ_r | $i^s_{qsh1} + i^s_{dsh2}$ (addition) | $i^s_{dsh2} - i^s_{qsh3}$ (subtraction) | $-i^s_{qsh3} - i^s_{dsh4}$ (addition) | $-i^s_{dsh4} + i^s_{qsh1}$ (subtraction) |
| cos 2θ_r | $i^s_{dsh1} - i^s_{qsh2}$ (subtraction) | $-i^s_{qsh2} - i^s_{dsh3}$ (addition) | $-i^s_{dsh3} + i^s_{qsh4}$ (subtraction) | $-i^s_{qsh4} + i^s_{dsh1}$ (addition) |

Thus, in each unit period, the cosine component (cos 2θ_r) and the sine component (sin 2θ_r) of two times the rotator angle (2θ_r) can be obtained, and the rotator angle θ_r in a current unit period can be obtained by an arctangent operation (tan⁻¹).

Accordingly, a rotator location may be internally detected without using an additional rotator location detecting apparatus such as a resolver, thereby reducing a size and unit manufacturing cost of an apparatus for driving an AC motor.

Figure 10:
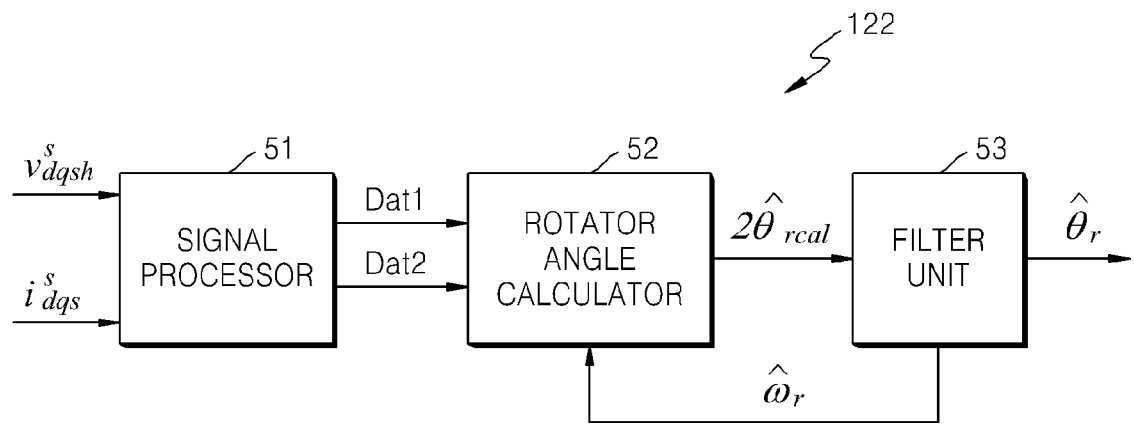
FIG. 10 is a block diagram of a rotator location detector in the apparatus of FIGS. 7.

FIG. 10 is a block diagram of the rotator location detector 122 in the apparatus of FIG. 7.

Referring to FIGS. 7 and 10, the rotator location detector 122 includes a signal processor 51, a rotator angle calculator 52, and a filter unit 53.

The signal processor 51 receives $d^s$- and $q^s$-axes driving currents $i^s_{dqs}$ from the first feedback current transformer 1211 and $d^s$- and $q^s$-axes injection voltages $v^s_{dqsh}$ from the injection voltage generator 1218 and simultaneously outputs data Dat1 of a result of subtracting a $d^s$-axis injection current in a previous unit period from a $q^s$-axis injection current in a current unit period and data Dat2 of a result of adding a $q^s$-axis injection current in the previous unit period to a $d^s$-axis injection current in the current unit period.

The rotator angle calculator 52 obtains a sine component and a cosine component of a rotator angle by substituting the data Dat1 of the subtraction result and the data Dat2 of the addition result into the subtraction and addition equation of Equation 11 and obtains two times the rotator angle ($2\hat{\theta}_{rCal}$) in the current unit period according to the sine component and the cosine component of the rotator angle.

The filter unit 53 finally obtains a rotator angle $\hat{\theta}_r$ by canceling a noise component of the two times the rotator angle ($2\hat{\theta}_{rCal}$) input from the rotator angle calculator 52 and provides the finally obtained rotator angle $\hat{\theta}_r$ to the second feedback current transformer 1212 and the control voltage transformer 1217 in the driving controller 121.

Figure 11:
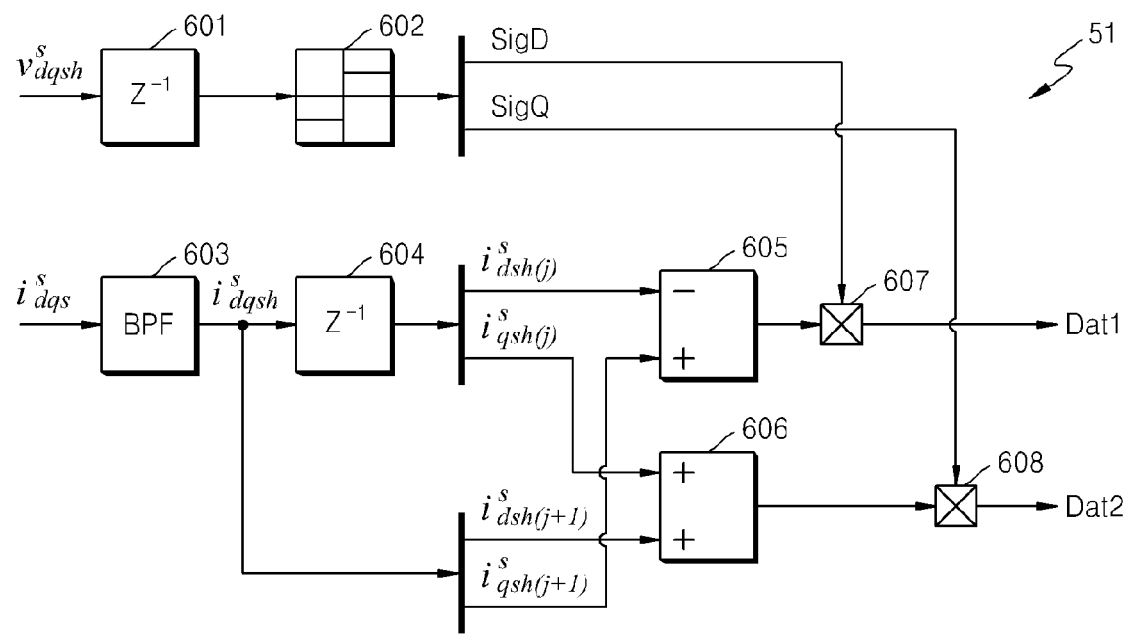
FIG. 11 is a block diagram of a signal processor in the rotator location detector of FIG. 10.

FIG. 11 is a block diagram of the signal processor 51 in the rotator location detector 122 of FIG. 10.

Referring to FIGS. 7 and 11 and Table 1, the signal processor 51 included in the rotator location detector 122 includes a first unit period delay unit 601, a polarity determiner 602, a Band Pass Filter (BPF) 603, a second unit period delay unit 604, a second current subtractor 605, a current adder 606, a first multiplier 607, and a second multiplier 608.

The first unit period delay unit 601 generates $d^s$- and $q^s$-axes injection voltages $v^s_{dqsh}$ in a current unit period by delaying $d^s$- and $q^s$-axes injection voltages $v^s_{dqsh}$ input from the injection voltage generator 1218 by one unit period.

The polarity determiner 602 receives the $d^s$- and $q^s$-axes injection voltages $v^s_{dqsh}$ in the current unit period from the first unit period delay unit 601 and generates a polarity signal SigD of a $d^s$-axis injection voltage and a polarity signal SigQ of a $q^s$-axis injection voltage in the current unit period.

The BPF 603 generates a $d^s$-axis injection current $i^s_{dsh}(j+1)$ and a $q^s$-axis injection current $i^s_{qsh}(j+1)$ in the current unit period by performing band filtering of $d^s$- and $q^s$-axes driving currents $i^s_{dqs}$ input from the first feedback current transformer 1211.

The second unit period delay unit 604 generates a $d^s$-axis injection current $i^s_{dsh}(j)$ and a $q^s$-axis injection current $i^s_{qsh}(j)$ in a previous unit period with respect to the $d^s$-axis injection current $i^s_{dsh}(j+1)$ and the $q^s$-axis injection current $i^s_{qsh}(j+1)$ in the current unit period by delaying the $d^s$-axis injection current $i^s_{dsh}(j+1)$ and the $q^s$-axis injection current $i^s_{qsh}(j+1)$ in the current unit period, which are input from the BPF 603, by one unit period.

The second current subtractor 605 subtracts the $d^s$-axis injection current $i^s_{dsh}(j)$ in the previous unit period, which is input from the second unit period delay unit 604, from the $q^s$-axis injection current $i^s_{qsh}(j+1)$ in the current unit period, which is input from the BPF 603, and outputs a subtraction result.

The current adder 606 adds the $q^s$-axis injection current $i^s_{qsh}(j)$ in the previous unit period, which is input from the second unit period delay unit 604, to the $d^s$-axis injection current $i^s_{dsh}(j+1)$ in the current unit period, which is input from the BPF 603, and outputs an addition result.

The first multiplier 607 receives the subtraction result from the second current subtractor 605 and the polarity signal SigD of the $d^s$-axis injection voltage from the polarity determiner 602 and generates data Dat1 of the subtraction result by multiplying the subtraction result from the second current subtractor 605 by the polarity of the $d^s$-axis injection voltage.

The second multiplier 608 receives the addition result from the current adder 606 and the polarity signal SigQ of the $q^s$-axis injection voltage from the polarity determiner 602 and generates data Dat2 of the addition result by multiplying the addition result from the current adder 606 by the polarity of the $q^s$-axis injection voltage.

As described above, according to the second exemplary embodiment, four pairs of $d^s$- and $q^s$-axes injection voltages having different polarity sets are sequentially applied in a control injection period.

In addition, a rotator angle in a current unit period may be obtained in the control injection period according to a result of subtracting a $d^s$-axis injection current in a previous unit period from a $q^s$-axis injection current in the current unit period and a result of adding a $d^s$-axis injection current in the current unit period to a $q^s$-axis injection current in the previous unit period.

That is, the rotator angle in the current unit period may be obtained by substituting the subtraction result and the addition result into relational equations of a voltage and a current by an inductance of an AC motor.

Thus, a rotator location may be internally detected without using an additional rotator location detecting apparatus such as a resolver, thereby reducing a size and unit manufacturing cost of an apparatus for driving the AC motor.

As a result, according to the first and second exemplary embodiments, when different $d^s$-axis voltages and different $q^s$-axis voltages are sequentially applied to an AC motor in a control injection period, a rotator angle may be obtained by a $d^s$-axis voltage, a $q^s$-axis voltage, a $d^s$-axis current, and a $q^s$-axis current.

Thus, a rotator location may be internally detected without using an additional rotator location detecting apparatus such as a resolver, thereby reducing a size and unit manufacturing cost of an apparatus for driving the AC motor.

While the exemplary embodiments have been particularly shown and described with reference to the accompanying drawings thereof, it will be understood by those of ordinary skill in the art that various changes in form and details may be made therein without departing from the spirit and scope of the inventive concept as defined by the following claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A method of driving an alternating-current (AC) motor, the method comprising:
  (a) driving the AC motor by a $d^S$-axis voltage, which is a voltage for an exciting current in a stationary reference frame, and a $q^S$-axis voltage, which is a voltage for generating a rotational force in the stationary reference frame, while applying different $d^S$-axis voltages and different $q^S$-axis voltages to the AC motor in a control injection period; and
  (b) obtaining a rotator angle by a $d^S$-axis voltage value, a $q^S$-axis voltage value, a $d^S$-axis current value, and a $q^S$-axis current value in the control injection period,
  wherein operation (b) comprises:
  (b1) obtaining difference values between current variations corresponding to the applied voltages and difference values between the applied voltages; and
  (b2) obtaining the rotator angle in the control injection period by using a matrix equation according to an inductance matrix of the AC motor, a voltage matrix including the voltage difference values, and a current matrix including the current variation difference values,
  wherein, in operation (a), the AC motor is driven by the $d^S$-axis voltage and the $q^S$-axis voltage, wherein a first $d^s$-axis voltage $v^s_{ds1}$ and a first $q^s$-axis voltage $v^s_{qs1}$ are applied in a first unit period of the control injection period, a second $d^s$-axis voltage $v^s_{ds2}$ and a second $q^s$-axis voltage $v^s_{qs2}$ are applied in a second unit period of the control injection period, and a third $d^s$-axis voltage $v^s_{ds3}$ and a third $q^s$-axis voltage $v^s_{qs3}$ are applied in a third unit period of the control injection period,
  wherein, in the control injection period of operation (b1), a difference value $v^s_{ds32}$ between the third $d^s$-axis voltage $v^s_{ds3}$ and the second $d^s$-axis voltage $v^s_{ds2}$, a difference value $v^s_{ds21}$ between the second $d^s$-axis voltage $v^s_{ds2}$ and the first $d^s$-axis voltage $v^s_{ds1}$, a difference value $v^s_{qs32}$ between the third $q^s$-axis voltage $v^s_{qs3}$ and the second $q^s$-axis voltage $v^s_{qs1}$, a difference value $v^s_{qs21}$ between the second $q^s$-axis voltage $v^s_{qs2}$ and the first $q^s$-axis voltage $v^s_{qs1}$, a difference value $\Delta i^s_{ds32}$ between a $d^s$-axis current variation $\Delta i^s_{ds3}$ in the third unit period and a $d^s$-axis current variation $\Delta i^s_{ds2}$ in the second unit period, a difference value $\Delta i^s_{ds21}$ between the $d^s$-axis current variation $\Delta i^s_{ds2}$ in the second unit period and a $d^s$-axis current variation $\Delta i^s_{ds3}$ in the first unit period, a difference value $\Delta i^s_{qs32}$ between a $q^s$-axis current variation $\Delta i^s_{qs3}$ in the third unit period and a $q^s$-axis current variation $\Delta i^s_{qs2}$ in the second unit period, and a difference value $\Delta i^s_{qs21}$ between the $q^s$-axis current variation $\Delta i^s_{qs2}$ in the second unit period and a $q^s$-axis current variation $\Delta i^s_{qs1}$ in the first unit period are obtained, and
  wherein operation (b2) comprises:
  (b2-1) obtaining 4 matrix variables $L_{11}$, $L_{12}$, $L_{21}$, and $L_{22}$ of an inductance matrix $L_S$ by using a matrix equation according to the inductance matrix $L_S$ including the 4 matrix variables $L_{11}$, $L_{12}$, $L_{21}$, and $L_{22}$, a voltage matrix including the 4 voltage difference values $v^s_{ds32}$, $v^s_{ds21}$, $v^s_{qs32}$, $v^s_{qs21}$, and a current matrix including the 4 current variation difference values $\Delta i^s_{ds32}$, $\Delta i^s_{ds21}$, $\Delta i^s_{qs32}$, and $\Delta i^s_{qs21}$; and
  (b2-2) obtaining a rotator angle in a current control injection period by using the 4 matrix variables $L_{11}$, $L_{12}$, $L_{21}$, and $L_{22}$.

2. An apparatus for driving an alternating-current (AC) motor, the apparatus comprising:
  a controller; and
  a driver which drives the AC motor according to voltages applied from the controller,
  wherein the controller comprises:
  a driving controller which drives the AC motor by a $d^S$-axis voltage, which is a voltage for an exciting current in a stationary reference frame, and a $q^S$-axis voltage, which is a voltage for generating a rotational force in the stationary reference frame, while sequentially applying different $d^S$-axis voltages and different $q^S$-axis voltages to the AC motor in a control injection period; and
  a rotator location detector which obtains a rotator angle by a $d^S$-axis voltage value, a $q^S$-axis voltage value, a $d^S$-axis current value, and a $q^S$-axis current value in the control injection period,
  wherein the rotator location detector obtains difference values between current variations corresponding to the applied voltages and difference values between the applied voltages and obtains the rotator angle in the control injection period by using a matrix equation according to an inductance matrix of the AC motor, a voltage matrix including the voltage difference values, and a current matrix including the current variation difference values, wherein a rotator of the AC motor rotates by applying a three-phase AC voltage to a stator of the AC motor, and wherein the driver comprises:

a driving voltage transformer for transforming the applied voltages $v^s_{dqs}$, which are the $d^s$-axis voltage $v^s_{ds}$ and the $q^s$-axis voltage $v^s_{qs}$ from the controller to a three-phase AC voltage; and a Pulse Width Modulator (PWM) for applying the three-phase AC voltage from the driving voltage transformer to the stator of the AC motor via pulse width modulation, wherein the driving controller comprises:

a first feedback current transformer for obtaining the $d^s$- and $q^s$-axes driving currents $i^s_{dqs}$ in the stationary reference frame by detecting a three-phase driving current flowing through the stator of the AC motor;

a second feedback current transformer for transforming the $d^s$- and $q^s$-axes driving currents $i^s_{dqs}$ in the stationary reference frame, which are input from the first feedback current transformer, to $d^s$- and $q^s$-axes driving currents $i^r_{dqs}$ in a synchronous reference frame according to an input rotator angle $\hat{\theta}_r$;

a current subtractor for generating error currents, which are difference values between $d^s$- and $q^s$-axes target currents $i^{r*}_{dqs}$ in the synchronous reference frame and the $d^s$- and $q^s$-axes driving currents $i^r_{dqs}$ input from the second feedback current transformer;

a proportional-integral controller for obtaining $d^s$- and $q^s$-axes feedback control voltages $v^r_{dqsfb}$ in the synchronous reference frame by performing a proportional-integral control of the error currents input from the current subtractor;

a forward control voltage generator for generating $d^s$- and $q^s$-axes forward control voltages $v^r_{dqsff}$ in the synchronous reference frame, which conforms to unique characteristics of the AC motor;

a first voltage adder for generating $d^s$- and $q^s$-axes control voltages $v^r_{dqsf}$ obtained by adding the $d^s$- and $q^s$-axes feedback control voltages $v^r_{dqsfb}$ input from the proportional-integral controller to the $d^s$- and $q^s$-axes forward control voltages $v^r_{dqsff}$ input from the forward control voltage generator;

a control voltage transformer for transforming the $d^s$- and $q^s$-axes control voltages $v^r_{dqsf}$ in the synchronous reference frame, which are input from the first voltage adder, to $d^s$- and $q^s$-axes control voltages $v^s_{dqsf}$ in the stationary reference frame according to the input rotator angle $\hat{\theta}_r$;

an injection voltage generator for generating additional $d^s$- and $q^s$-axes injection voltages $v^s_{dqsi}$ used to sequentially generate different $d^s$-axis voltages and different $q^s$-axis voltages from the applied voltages $v^s_{dqs}$ in the control injection period; and a second voltage adder for providing the applied voltages $v^s_{dqs}$ obtained by adding the $d^s$- and $q^s$-axes control voltages $v^s_{dqsf}$ in the stationary reference frame, which are input from the control voltage transformer, to the $d^s$- and $q^s$-axes injection voltages $v^s_{dqsi}$ in the stationary reference frame, which are input from the injection voltage generator, to the driving voltage transformer of the driver, wherein the second voltage adder outputs a first $d^s$-axis voltage $v^s_{ds1}$ and a first $q^s$-axis voltage $v^s_{qs1}$ in a first unit period of the control injection period, a second $d^s$-axis voltage $v^s_{ds2}$ and a second $q^s$-axis voltage $v^s_{qs2}$ in a second unit period of the control injection period, and a third $d^s$-axis voltage $v^s_{ds3}$ and a third $q^s$-axis voltage $v^s_{qs3}$ in a third unit period of the control injection period, and wherein the rotator location detector comprises a signal processor for obtaining, in the control injection period, a difference value $v^s_{ds32}$ between the third $d^s$-axis voltage $v^s_{ds3}$ and the second $d^s$-axis voltage $v^s_{ds2}$, a difference value $v^s_{ds21}$ between the second $d^s$-axis voltage $v^s_{ds2}$ and the first $d^s$-axis voltage $v^s_{ds1}$, a difference value $v^s_{qs32}$ between the third $q^s$-axis voltage $v^s_{qs3}$ and the second $q^s$-axis voltage $v^s_{qs2}$, a difference value $v^s_{qs21}$ between the second $q^s$-axis voltage $v^s_{qs2}$ and the first $q^s$-axis voltage $v^s_{qs1}$, a difference value $\Delta i^s_{ds32}$ between a $d^s$-axis current variation $\Delta i^s_{ds3}$ in the third unit period and a $d^s$-axis current variation $\Delta i^s_{ds2}$ in the second unit period, a difference value $\Delta i^s_{ds21}$ between the $d^s$-axis current variation $\Delta i^s_{ds2}$ in the second unit period and a $d^s$-axis current variation $\Delta i^s_{ds1}$ in the first unit period, a difference value $\Delta i^s_{qs32}$ between a $q^s$-axis current variation $\Delta i^s_{qs3}$ in the third unit period and a $q^s$-axis current variation $\Delta i^s_{qs2}$ in the second unit period, and a difference value $\Delta i^s_{qs21}$ between the $q^s$-axis current variation $\Delta i^s_{qs2}$ in the second unit period and a $q^s$-axis current variation $\Delta i^s_{qs1}$ in the first unit period and obtaining 4 matrix variables $L_{11}$, $L_{12}$, $L_{21}$, and $L_{22}$ of an inductance matrix $L_s$ by using a matrix equation according to the inductance matrix $L_S$ including the 4 matrix variables $L_{11}$, $L_{12}$, $L_{21}$, and $L_{22}$, a voltage matrix including the 4 voltage difference values $v^s_{ds32}$, $v^s_{ds21}$, $v^s_{qs32}$, $v^s_{qs21}$, and a current matrix including the 4 current variation difference values $\Delta i^s_{ds32}$, $\Delta i^s_{ds21}$, $\Delta i^s_{qs32}$, and $\Delta i^s_{qs21}$.

3. The apparatus of claim 2, wherein the rotator location detector further comprises:

a rotator angle calculator for calculating a rotator angle $\hat{\theta}_{rCal}$ in a current control injection period by using the 4 matrix variables $L_{11}$, $L_{12}$, $L_{21}$, and $L_{22}$; and a filter unit for finally obtaining a rotator angle $\hat{\theta}_r$ by canceling a signal noise component from the rotator angle $\hat{\theta}_{rCal}$ input from the rotator angle calculator and providing the finally obtained rotator angle $\hat{\theta}_r$ to the second feedback current transformer and the control voltage transformer in the driving controller.

4. The apparatus of claim 3, wherein the signal processor comprises:

a voltage matrix generator for obtaining the voltage matrix including the 4 voltage difference values $v^s_{ds32}$, $v^s_{ds21}$, $v^s_{qs32}$, $v^s_{qs21}$ in the control injection period by receiving the applied voltages $v^s_{dqs}$ from the second voltage adder in the driving controller and calculating the difference value $v^s_{ds32}$ between the third $d^s$-axis voltage $v^s_{ds3}$ and the second $d^s$-axis voltage $v^s_{ds2}$, the difference value $v^s_{ds21}$ between the second $d^s$-axis voltage $v^s_{ds2}$ and the first $d^s$-axis voltage $v^s_{ds1}$, the difference value $v^s_{qs32}$ between the third $q^s$-axis voltage $v^s_{qs3}$ and the second $q^s$-axis voltage $v^s_{qs2}$, and the difference value $v^s_{qs21}$ between the second $q^s$-axis voltage $v^s_{qs2}$ and the first $q^s$-axis voltage $v^s_{qs1}$;

a current matrix generator for obtaining the current matrix including the 4 current variation difference values $\Delta i^s_{ds32}$, $\Delta i^s_{ds21}$, $\Delta i^s_{qs32}$, and $\Delta i^s_{qs21}$ in the control injection period by receiving the $d^s$- and $q^s$-axes driving currents $i^s_{dqs}$ from the first feedback current transformer in the driving controller and calculating the difference value $\Delta i^s_{ds32}$ between the $d^s$-axis current variation $\Delta i^s_{ds3}$ in the third unit period and the $d^s$-axis current variation $\Delta i^s_{ds2}$ in the second unit period, the difference value $\Delta i^s_{ds21}$ between the $d^s$-axis current variation $\Delta i^s_{ds2}$ in the second unit period and the $d^s$-axis current variation $\Delta i^s_{ds1}$ in the first unit period, the difference value $\Delta i^s_{qs32}$ between the $q^s$-axis current variation $\Delta i^s_{qs3}$ in the third unit period and the $q^s$-axis current variation $\Delta i^s_{qs2}$ in the second unit period, and the difference value $\Delta i^s_{qs21}$ between the $q^s$-axis current variation $\Delta i^s_{qs2}$ in the second unit period and the $q^s$-axis current variation $\Delta i^s_{qs1}$ in the first unit period;

a current matrix transformer for obtaining an inverse matrix of the current matrix input from the current matrix generator; and a variable value calculator for obtaining the 4 matrix variables $L_{11}, L_{12}, L_{21}$, and $L_{22}$ of the inductance matrix $L_S$ by using a matrix equation according to the inductance matrix $L_S$ including the 4 matrix variables $L_{11}, L_{12}, L_{21}$, and $L_{22}$, the voltage matrix input from the voltage matrix generator, and the current inverse-matrix input from the current matrix transformer.

* * * * *